United States Patent
Abedini et al.

(10) Patent No.: US 11,595,920 B2
(45) Date of Patent: *Feb. 28, 2023

(54) REFERENCE SIGNAL SCHEMES IN WIRELESS COMMUNICATIONS

(71) Applicant: QUALCOMM Incorporated, San Diego, CA (US)

(72) Inventors: Navid Abedini, Basking Ridge, NJ (US); Hung Ly, San Diego, CA (US); Tao Luo, San Diego, CA (US); Bilal Sadiq, Basking Ridge, NJ (US); Muhammad Nazmul Islam, Littleton, MA (US); Sundar Subramanian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 85 days.

This patent is subject to a terminal disclaimer.

(21) Appl. No.: 17/172,971

(22) Filed: Feb. 10, 2021

(65) Prior Publication Data

US 2021/0168741 A1    Jun. 3, 2021

Related U.S. Application Data

(60) Division of application No. 16/035,314, filed on Jul. 13, 2018, now Pat. No. 10,939,395, which is a continuation of application No. 15/934,784, filed on Mar. 23, 2018, now Pat. No. 10,285,147.

(60) Provisional application No. 62/483,943, filed on Apr. 10, 2017.

(51) Int. Cl.
*H04W 56/00* (2009.01)
*H04L 5/00* (2006.01)

(52) U.S. Cl.
CPC ......... *H04W 56/001* (2013.01); *H04L 5/0005* (2013.01); *H04L 5/0048* (2013.01);
(Continued)

(58) Field of Classification Search
None
See application file for complete search history.

(56) References Cited

U.S. PATENT DOCUMENTS

| 6,023,620 A | 2/2000 | Hansson |
| 6,074,435 A | 6/2000 | Rojest |

(Continued)

FOREIGN PATENT DOCUMENTS

| CN | 102422587 A | 4/2012 |
| CN | 104081852 A | 10/2014 |

(Continued)

OTHER PUBLICATIONS

Intel, "Initial Access Signal/Channels for NR-Unlicensed", R1-1912194 as submitted by the applicant dated Jun. 20, 2022 (Year: 2019).*

(Continued)

*Primary Examiner* — Jamaal Henson
(74) *Attorney, Agent, or Firm* — Holland & Hart LLP

(57) ABSTRACT

Methods, systems, and devices for wireless communication are described that provide for synchronization signal (SS) blocks in which synchronization signals and broadcast channel transmissions may be transmitted. Broadcast channel transmissions may be demodulated using SS transmissions, reference signal transmissions, or combinations thereof. Broadcast channel transmissions may be transmitted in a subset of SS block time resources, and synchronization signals may be transmitted in another subset of SS block time resources. Reference signals may be transmitted using tones within the broadcast channel time resources, and may be transmitted at a higher density for portions of the broadcast channel transmission bandwidth that are outside of the SS transmission bandwidth. Waveforms for reference signal transmissions, and information provided by reference signal transmissions may be provided.

30 Claims, 22 Drawing Sheets

(52) U.S. Cl.
CPC .......... *H04L 5/0051* (2013.01); *H04L 5/0064* (2013.01); *H04L 5/0091* (2013.01)

(56) References Cited

U.S. PATENT DOCUMENTS

| | | | |
|---|---|---|---|
| 6,549,770 | B1 | 4/2003 | Marran |
| 6,622,017 | B1 | 9/2003 | Hoffman |
| 8,964,621 | B2 | 2/2015 | Bachu et al. |
| 9,553,704 | B2 | 1/2017 | You et al. |
| 9,749,144 | B2 | 8/2017 | Xu et al. |
| 10,285,147 | B2 | 5/2019 | Abedini et al. |
| 10,476,623 | B2 | 11/2019 | Ly et al. |
| 10,791,542 | B2 | 9/2020 | Chen et al. |
| 2001/0049263 | A1 | 12/2001 | Zhang |
| 2003/0143952 | A1 | 7/2003 | Haller et al. |
| 2003/0143991 | A1 | 7/2003 | Minear et al. |
| 2003/0163551 | A1 | 8/2003 | Riordan |
| 2004/0018831 | A1 | 1/2004 | Majmundar et al. |
| 2004/0073901 | A1 | 4/2004 | Imamatsu |
| 2006/0130053 | A1 | 6/2006 | Buljore et al. |
| 2009/0007091 | A1 | 1/2009 | Appiah et al. |
| 2010/0234008 | A1 | 9/2010 | Kumar |
| 2012/0008575 | A1* | 1/2012 | Vujcic ................. H04W 74/002 370/329 |
| 2013/0157637 | A1 | 6/2013 | Bos |
| 2013/0242730 | A1* | 9/2013 | Pelletier ............ H04W 74/0833 370/230 |
| 2014/0036747 | A1 | 2/2014 | Nory et al. |
| 2014/0204851 | A1 | 7/2014 | Chen et al. |
| 2015/0016239 | A1 | 1/2015 | Yi et al. |
| 2015/0181589 | A1 | 6/2015 | Luo et al. |
| 2016/0205664 | A1 | 7/2016 | Zhang et al. |
| 2016/0219570 | A1* | 7/2016 | Guo ..................... H04W 72/085 |
| 2017/0064685 | A1 | 3/2017 | Rico Alvarino et al. |
| 2017/0099656 | A1 | 4/2017 | Seo et al. |
| 2017/0331670 | A1 | 11/2017 | Parkvall et al. |
| 2018/0084593 | A1* | 3/2018 | Chen ..................... H04L 5/0007 |
| 2018/0123849 | A1 | 5/2018 | Si et al. |
| 2018/0167946 | A1 | 6/2018 | Si et al. |
| 2018/0248642 | A1 | 8/2018 | Si et al. |
| 2018/0262900 | A1* | 9/2018 | Moon ................. H04L 27/26025 |
| 2018/0278356 | A1* | 9/2018 | Zhou ..................... H04J 11/0076 |
| 2018/0295590 | A1 | 10/2018 | Abedini et al. |
| 2018/0343628 | A1 | 11/2018 | Abedini et al. |
| 2019/0180869 | A1 | 6/2019 | Volpe |
| 2019/0306892 | A1* | 10/2019 | Xiong ................... H04W 88/02 |
| 2019/0357159 | A1* | 11/2019 | Pan ....................... H04J 11/0076 |
| 2022/0086774 | A1* | 3/2022 | Qian ......................... H04B 7/00 |

FOREIGN PATENT DOCUMENTS

| | | |
|---|---|---|
| CN | 105830379 A | 8/2016 |
| CN | 105981322 A | 9/2016 |
| EP | 3571802 A2 | 11/2019 |
| IN | 212013 | 5/2013 |
| JP | 2020508614 A | 3/2020 |
| WO | WO-2010129885 | 11/2010 |
| WO | WO-2013112960 A1 | 8/2013 |
| WO | WO-2013116272 A1 | 8/2013 |
| WO | WO-2015094816 A1 | 6/2015 |
| WO | WO-2015116534 | 8/2015 |
| WO | WO-2017004087 A1 | 1/2017 |
| WO | WO-2017023043 A1 | 2/2017 |
| WO | WO-2018187297 | 10/2018 |
| WO | WO-2019098770 A1 * | 5/2019 ........... H04L 5/0048 |
| WO | WO-2022064241 A1 * | 3/2022 |

OTHER PUBLICATIONS

European Search Report—EP22162859—Search Authority—The Hague—dated Jun. 3, 2022.
ITL: "On NR PBCH Design", 3GPP Draft, 3GPP TSG RAN WG1 Meeting #88bis, R1-1705793 NR-PBCH, 3rd Generation Partnership Project (3GPP), Mobile Competence Centre, 650, Route Des Lucioles, F-06921, Sophia-Anti Polis Cedex, France, vol. RAN WG1, No. Spokane, USA; Apr. 3, 2017-Apr. 7, 2017, Apr. 2, 2017, XP051243907, XP055528340, Retrieved from the Internet: URL:http://www.3gpp.org/ftp/Meetings_3GPP_SYNC/RAN1/Docs/, http://www.3gpp.org/ftp/Meetings_3GPP_SYNC/RAN1/Docs/ [retrieved on Apr. 2, 2017], section 2.3, 8 pages.
LG Electronics: "Discussion on SS Block, SS Burst Set Composition and Time Index Indication", 3GPP Draft, 3GPP TSG RAN WG1 Meeting #88bis, R1-1704862, LG_Discussion on SS Block, SS Burst Set Composition and Time Index Indication, 3rd Generation Partnership Project (3GPP), Mobile Competence Centre, 650, Route Des Lucioles, F-06921, Sophia-Antipolis Cedex, F, vol. RAN WG1, No. Spokane, USA; Apr. 3, 2017-Apr. 7, 2017, Apr. 2, 2017, XP051242997, 8 Pages, Retrieved from the Internet: URL: http://www.3gpp.org/ftp/Meetings_3GPP_SYNC/RAN1/Docs/ [retrieved on Apr. 2, 2017], Sections 1-3, section 2, figure 4.
Qualcomm Incorporated: "SS Block, Burst-Set Composition, and Time Index Indication", 3GPP Draft, 3GPP TSG-RAN WG1 NR #88bis, R1-1705565, SS Composition and SS Time Index Indication Consideration, 3rd Generation Partnership Project (3GPP), Mobile Competence Centre, 650, Route Des Lucioles, F-06921, Sophia-Antipolis Cedex, France, vol. RAN WG1, No. Spokane, USA, Apr. 3, 2017-Apr. 7, 2017, 10 Pages, Apr. 2, 2017, XP051243693, XP051252003, Retrieved from the Internet: URL: http://www.3gpp.org/ftp/Meetings_3GPP_SYNC/RAN1/Docs/, http://www.3gpp.org/ftp/Meetings_3GPP_SYNC/RAN1/Docs/, [retrieved on Apr. 2, 2017] (p. 2 to 6) p. 3, paragraph 2, figure 1, agenda item 8.1.1.1.2, sections 3 and 4, figure 2.
Sequans Communications: "Discussion on SS Time Index Indication", 3GPP Draft, R1-1704599, 3GPP TSG-RAN WG1 88 bis, 3rd Generation Partnership Project (3GPP), Mobile Competence Centre, 650, Route Des Lucioles, F-06921, Sophia-Antipolis Cedex, France, vol. RAN WG1, No. Spokane, USA, Apr. 3, 2017-Apr. 7, 2017, Apr. 2, 2017, (Apr. 2, 2017), XP051242738, 10 Pages, Mar. 25, 2017, Retrieved from the Internet: URL: http://www.3gpp.org/ftp/Meetings_3GPP_SYNC/RAN1/Docs/ [Retrieved on Apr. 2, 2017], Sections 2 and 5, Section 3, 4, figure 1.
Taiwan Search Report—TW107110254—TIPO—dated Aug. 25, 2021.
Ericsson, "NR Synchronization Signal Design and Evaluation[online]", 3GPP TSG RAN WG1 #8 8b, R1-1706007, Mar. 28, 2017, [Search Date: Feb. 19, 2018], Spokane, WA, USA, Apr. 3-7, 2017, Internet: URL: http://www.3gpp.org/ftp/tsg_ran/WG1_RL1/TSGR1_88b/Docs/R1-1706007.zip. 10 Pages.
Interdigital Communications: "On NR-PBCH Transmission", 3GPP TSG RAN WG1 Meeting #88bis, R1-1705500, Spokane, USA, Apr. 3-7, 2017, pp. 1-8, URL: https://www.3gpp.org/ftp/tsg_ran/WG1_RL1/TSGR1_88b/Docs/R1-1705500.zip.
Mediatek Inc: "TDM Based Unified SS Block Design: Signal Structure and Performance", 3GPP Draft, R1-1702727, 3GPP TSG RAN WG1 Meeting #88, 3rd Generation Partnership Project (3GPP), Mobile Competence Centre, 650, Route Des Lucioles, F-06921, vol. RAN WG1, No. Athens, Greece, Feb. 12, 2017, XP051209874, 6 Pages, Retrieved from the Internet: URL:http://www.3gpp.org/ftp/Meetings_3GPP_SYNC/RAN1/Docs/ [retrieved on Feb. 12, 2017].
ZTE, et al., "NR-PBCH Design [online]", 3GPP TSG RAN WG1 #88b, R1-1704361, Mar. 25, 2017, [Search date: Jan. 23, 2018], Spokane, USA Apr. 3-7, 2017, Internet: URL: http://www.3gpp.org/ftp/tsg_ran/WG1_RL1/TSGR1_88b/Docs/R1-1704361.zip. 9 Pages.
CATT: "SS Burst Set and SS Block Configuration", 3GPP TSG RAN WG1 Meeting #88, R1-1702058, Athens, Greece, Feb. 13-17, 2017, 3 Pages.
International Search Report and Written Opinion—PCT/US2018/024352—ISA/EPO—dated Aug. 22, 2018.
International Preliminary Report on Patentability—PCT/US2018/024352, The International Bureau of WIPO—Geneva, Switzerland, dated Oct. 24, 2019.
Nokia: "Cell Identification in NR", 3GPP TSG-RAN WG1 Meeting #88, R1-1703098, Athens, Greece, Feb. 13-17, 2017, 4 pages.
NTT Docomo: "Discussion on NR-PBCH Design", 3GPP TSG RAN WG1 Meeting #88, R1-1702827, Athens, Greece, Feb. 13-17, 2017, 7 pages.

(56) References Cited

OTHER PUBLICATIONS

NTT Docomo: "Discussion on SS Burst Set Composition and SS Block Index Indication for NR", 3GPP TSG RAN WG1 Meeting #88, R1-1702823 Athens, Greece, Feb. 13-17, 2017, 6 pages.
Partial International Search Report—PCT/US2018/024352—ISA/EPO—dated Jun. 26, 2018.
Samsung: "SS Bandwidth and Sequence Design," 3GPP Draft; R1-1705317, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017 (Apr. 2, 2017), XP051243447, pp. 1-12, Retrieved from the Internet: URL: http://www.3gpp.org/ftp/Meetings_3GPP_SYNC/RAN1/Docs/ [retrieved on Apr. 2, 2017].
Samsung: "SS Block Composition, SS Burst Set Composition and SS Time Index Indication", 3GPP Draft; R1-1705318, 3rd Generation Partnership Project (3GPP), Mobile Competence Centre, 650, Route Des Lucioles, F-06921, Sophia-Antipolis Cedex, France, vol. RAN WG1, No. Spokane. USA; Apr. 3, 2017-Apr. 7, 2017, Apr. 2, 2017 (Apr. 2, 2017), XP051243448, 12 pages, Retrieved from the Internet: URL: http://www.3gpp.org/ftp/Meetings_3GPP_SYNC/RAN1/Docs/ [retrieved on Apr. 2, 2017].
Interdigital Communications: "Considerations on Reference Signal Design for NR", 3GPP Draft; R1-167573, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 21, 2016, XP051140727, 8 Pages, Retrieved from the Internet: URL: http://www.3gpp.org/ftp/Meetings_3GPP_SYNC/RAN1/Docs/ [retrieved on Aug. 21, 2016], 5 pages.
NTT Docomo Inc: "Discussion on SS Block Composition, SS Burst Set Composition and SS Block Index Indication for NR", 3GPP Draft, 3GPP TSG RAN WG1 Meeting #88bis, R1-1705705_Discussion on SS Block_Burst Set Composition and SS Block Index Indication for NR_FINAL2, 3rd Generation Partnership Project (3GPP), vol. RAN WG1, No. Spokane, USA, Apr. 3, 2017-Apr. 7, 2017, Apr. 2, 2017 (Apr. 2, 2017), XP051243820, 8 Pages, Retrieved from the Internet: URL: https://www.3gpp.org/ftp/Meetings_3GPP_SYNC/RAN1/Docs/[retrieved on Apr. 2, 2017], Chapter 2.2, Sec. 2.1 to 3.2.
Samsung: "NR-PBCH Design," 3GPP Draft, R1-1705321, 3rd Generation Partnership Project (3GPP), Mobile Competence Centre, 650 Route Des Lucioles, F-06921 Sophia-Antipolis Cedex, France, vol. RAN WG1, Spokane, USA, Apr. 3, 2017-Apr. 7, 2017, Apr. 2, 2017, (Apr. 2, 2017), XP051243451, 8 pages, Retrieved from the Internet: URL:http://www.3gpp.org/ftp/Meetings_3GPP_SYNC/RAN1/Docs/. [Retrieved on Apr. 2, 2017].
Huawei, et al., "Resource Allocation and Indication for Data Channel," 3GPP Draft, 3GPP TSG RAN WG1 Meeting #88bis, R1-1705069, Apr. 7, 2017, 8 pages.
Nokia, et al., "SS Block Composition, SS Burst Set Composition and SS Time Index Indication," 3GPP TSG-RAN WG1 Meeting #88bis, R1-1705837, Spokane, WA, USA, Apr. 3-7, 2017, 13 pages.
Taiwan Search Report—TW110140921—TIPO—dated Oct. 13, 2022.

* cited by examiner

REFERENCE SIGNAL SCHEMES IN WIRELESS COMMUNICATIONS

CROSS REFERENCES

The present application for patent is a Divisional of U.S. patent application Ser. No. 16/035,314 by Abedini et al., entitled "Reference Signal Schemes in Wireless Communications" and filed Jul. 13, 2018, which is a Continuation of U.S. patent application Ser. No. 15/934,784 by Abedini et al., entitled "Reference Signal Schemes in Wireless Communications" and filed Mar. 23, 2018, which claims priority to U.S. Provisional Patent Application No. 62/483,943 by Abedini et al., entitled "Reference Signal Schemes in Wireless Communications" and filed Apr. 10, 2017, each of which is assigned to the assignee hereof, and each of which is expressly incorporated herein by reference.

BACKGROUND

The following relates generally to wireless communication, and more specifically to reference signal schemes in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) or 5G system).

In some examples, a wireless multiple-access communication system may include a number of base stations, each simultaneously supporting communication for multiple communication devices, otherwise known as user equipment (UEs). In a LTE or LTE-Advanced (LTE-A) networks, a set of one or more base stations may define an eNodeB (eNB). In other examples (e.g., in a NR or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

At times, a UE may need to perform an initial access (or initial acquisition) procedure to gain access to a wireless network. As part of the initial access procedure, the UE may need to search for a synchronization channel transmitted by a network access device, such as a base station, of the wireless network. The UE also may acquire various items of system information, such as contained in a master information block (MIB) or one or more system information blocks (e.g., SIB1, SIB2, etc.) that may be transmitted in a physical broadcast channel (PBCH) transmission from a base station.

SUMMARY

The described techniques relate to improved methods, systems, devices, or apparatuses that support reference signal schemes in wireless communications. Generally, the described techniques provide for synchronization signal (SS) blocks in which synchronization signals and physical broadcast channel (PBCH) transmissions may be transmitted. In some cases, PBCH transmissions may be demodulated using SS transmissions, reference signal transmissions, or combinations thereof. In some examples, PBCH transmissions may be transmitted in a subset of SS block time resources (e.g., in two symbols of an SS block), and synchronization signals (e.g., primary synchronization signal (PSS) and secondary synchronization signal (SSS)) may be transmitted in another subset of SS block time resources.

In some cases, reference signals (e.g., a demodulation reference signal (DMRS)) may be transmitted using tones within the PBCH time resources, and the locations of the tones may be selected to provide efficient demodulation using relatively few transmission resources. In some cases, a bandwidth of the PBCH transmissions may be greater than a bandwidth of SS transmissions, and DMRS may be transmitted at a higher density for portions of the PBCH transmission bandwidth that are outside of the SS transmission bandwidth. In some cases, different DMRS tones may be used for different PBCH time resources.

In some cases, a DMRS waveform may be configured across PBCH time resources (e.g., across two or more symbols that contain PBCH transmissions). In some examples, a same DMRS sequence may be used for each PBCH symbol, and each PBCH symbol may include a same number of DMRS tones. In other examples, PBCH symbols may include a subset of common DMRS tones across PBCH symbols and a subset of DMRS tones that are different across PBCH symbols. In such examples, the common DMRS tones may share a same DMRS sequence, and the other DMRS tones may have a different sequence. In still further examples, the DMRS waveforms for different symbols of PBCH transmissions may be completely different. In some examples, different DMRS sequences may be constructed by splitting a long base sequence among different PBCH time resources (e.g., a long Zadoff-Chu sequence, m-sequence, or cyclic shifts thereof). In some examples, reference signal sequences (e.g., DMRS sequences), tone locations, or combinations thereof may be used to convey one or more of identification information, timing information, configuration information, or any combination thereof.

A method of wireless communication is described. The method may include identifying a first set of wireless resources for synchronization signal transmissions and a second set of wireless resources for broadcast channel transmissions, the first set of wireless resources comprising a first set of frequency resources that span a first bandwidth and the second set of wireless resources comprising a second set of frequency resources that span a second bandwidth that overlaps at least a portion of the first bandwidth, identifying locations of reference signal resources within the second set of wireless resources based at least in part on one or more of a time resource location within the second set of wireless resources or a frequency resource location within the second set of wireless resources relative to the first bandwidth, and receiving reference signal transmissions using the reference signal resources.

An apparatus for wireless communication is described. The apparatus may include means for identifying a first set of wireless resources for synchronization signal transmissions and a second set of wireless resources for broadcast channel transmissions, the first set of wireless resources comprising a first set of frequency resources that span a first bandwidth and the second set of wireless resources comprising a second set of frequency resources that span a second bandwidth that overlaps at least a portion of the first bandwidth, means for identifying locations of reference signal resources within the second set of wireless resources based at least in part on one or more of a time resource location within the second set of wireless resources or a frequency resource location within the second set of wireless resources relative to the first bandwidth, and means for receiving reference signal transmissions using the reference signal resources.

Another apparatus for wireless communication is described. The apparatus may include a processor, memory in electronic communication with the processor, and instructions stored in the memory. The instructions may be operable to cause the processor to identify a first set of wireless resources for synchronization signal transmissions and a second set of wireless resources for broadcast channel transmissions, the first set of wireless resources comprising a first set of frequency resources that span a first bandwidth and the second set of wireless resources comprising a second set of frequency resources that span a second bandwidth that overlaps at least a portion of the first bandwidth, identify locations of reference signal resources within the second set of wireless resources based at least in part on one or more of a time resource location within the second set of wireless resources or a frequency resource location within the second set of wireless resources relative to the first bandwidth, and receive reference signal transmissions using the reference signal resources.

A non-transitory computer readable medium for wireless communication is described. The non-transitory computer-readable medium may include instructions operable to cause a processor to identify a first set of wireless resources for synchronization signal transmissions and a second set of wireless resources for broadcast channel transmissions, the first set of wireless resources comprising a first set of frequency resources that span a first bandwidth and the second set of wireless resources comprising a second set of frequency resources that span a second bandwidth that overlaps at least a portion of the first bandwidth, identify locations of reference signal resources within the second set of wireless resources based at least in part on one or more of a time resource location within the second set of wireless resources or a frequency resource location within the second set of wireless resources relative to the first bandwidth, and receive reference signal transmissions using the reference signal resources.

In some examples of the method, apparatus, and non-transitory computer-readable medium described above, the second bandwidth may be larger than the first bandwidth. In some examples of the method, apparatus, and non-transitory computer-readable medium described above, the identifying locations of the reference signal resources comprises identifying non-uniformly distributed reference signal resources across the second set of frequency resources.

In some examples of the method, apparatus, and non-transitory computer-readable medium described above, the second set of frequency resources comprise a first subset of frequency resources that may be overlapping with the first bandwidth and a second subset of frequency resources that may be non-overlapping with the first bandwidth, and the second subset of frequency resources may have a higher density of reference signal resources than the first subset of frequency resources. In some examples of the method, apparatus, and non-transitory computer-readable medium described above, the first subset of frequency resources may be devoid of reference signal resources.

In some examples of the method, apparatus, and non-transitory computer-readable medium described above, the second set of wireless resources comprises a first subset of time resources and a second subset of time resources, and the reference signal resources may be non-uniformly distributed across the first subset of time resources and the second subset of time resources. In some examples of the method, apparatus, and non-transitory computer-readable medium described above, the second set of wireless resources comprises a first subset of time resources and a second subset of time resources, and the reference signal resources within the first subset of time resources occupy different frequency resources than at least a portion of reference signal resources within the second subset of time resources. In some examples of the method, apparatus, and non-transitory computer-readable medium described above, the second set of wireless resources comprises a first subset of time resources and a second subset of time resources, and at least a portion of the reference signal resources within the first subset of time resources and the second subset of time resources occupy common frequency tones.

In some examples of the method, apparatus, and non-transitory computer-readable medium described above, the second set of wireless resources comprise PBCH resources and the first set of wireless resources comprise synchronization signal resources. In some examples of the method, apparatus, and non-transitory computer-readable medium described above, the PBCH resources comprise a first symbol of time resources and a third symbol of time resources, the synchronization signal resources comprise a second symbol of time resources and a fourth symbol of time resources, the second symbol of time resources located between the first symbol of time resources and the third symbol of time resources, and the fourth symbol of time resources located after the third symbol of time resources.

In some examples of the method, apparatus, and non-transitory computer-readable medium described above, the second symbol of time resources may be for transmission of a secondary synchronization signal and the fourth symbol of time resources may be for transmission of a primary synchronization signal. In some examples of the method, apparatus, and non-transitory computer-readable medium described above, the reference signal transmissions comprise DMRS transmissions.

In some examples of the method, apparatus, and non-transitory computer-readable medium described above, the second set of wireless resources comprises a first subset of time resources and a second subset of time resources, and locations of reference signal resources are identified within the first subset of time resources and the second subset of time resources. Some examples of the method, apparatus, and non-transitory computer-readable medium described above may further include processes, features, means, or instructions for determining a waveform of the reference signal transmissions based at least in part on the locations of the reference signal resources. Some examples of the method, apparatus, and non-transitory computer-readable medium described above may further include processes, features, means, or instructions for performing a channel estimation based at least in part on the received reference signal transmissions and the determined waveform of the reference signal transmissions.

Some examples of the method, apparatus, and non-transitory computer-readable medium described above may further include processes, features, means, or instructions for determining one or more of a transmitter identification, timing information, or synchronization signal transmission configuration based at least in part on the received reference signal transmissions.

A method of wireless communication is described. The method may include identifying a first set of wireless resources for synchronization signal transmissions and a second set of wireless resources for broadcast channel transmissions, the second set of wireless resources comprising a first subset of time resources and a second subset of time resources, identifying locations of reference signal resources within the first subset of time resources and the second subset of time resources, receiving reference signal transmissions over the reference signal resources, determining a waveform of the reference signal transmissions based at least in part on the locations of the reference signal resources, and performing a channel estimation based at least in part on the received reference signal transmissions and the determined waveform of the reference signal transmissions.

An apparatus for wireless communication is described. The apparatus may include means for identifying a first set of wireless resources for synchronization signal transmissions and a second set of wireless resources for broadcast channel transmissions, the second set of wireless resources comprising a first subset of time resources and a second subset of time resources, means for identifying locations of reference signal resources within the first subset of time resources and the second subset of time resources, means for receiving reference signal transmissions over the reference signal resources, means for determining a waveform of the reference signal transmissions based at least in part on the locations of the reference signal resources, and means for performing a channel estimation based at least in part on the received reference signal transmissions and the determined waveform of the reference signal transmissions.

Another apparatus for wireless communication is described. The apparatus may include a processor, memory in electronic communication with the processor, and instructions stored in the memory. The instructions may be operable to cause the processor to identify a first set of wireless resources for synchronization signal transmissions and a second set of wireless resources for broadcast channel transmissions, the second set of wireless resources comprising a first subset of time resources and a second subset of time resources, identify locations of reference signal resources within the first subset of time resources and the second subset of time resources, receive reference signal transmissions over the reference signal resources, determine a waveform of the reference signal transmissions based at least in part on the locations of the reference signal resources, and perform a channel estimation based at least in part on the received reference signal transmissions and the determined waveform of the reference signal transmissions.

A non-transitory computer readable medium for wireless communication is described. The non-transitory computer-readable medium may include instructions operable to cause a processor to identify a first set of wireless resources for synchronization signal transmissions and a second set of wireless resources for broadcast channel transmissions, the second set of wireless resources comprising a first subset of time resources and a second subset of time resources, identify locations of reference signal resources within the first subset of time resources and the second subset of time resources, receive reference signal transmissions over the reference signal resources, determine a waveform of the reference signal transmissions based at least in part on the locations of the reference signal resources, and perform a channel estimation based at least in part on the received reference signal transmissions and the determined waveform of the reference signal transmissions.

In some examples of the method, apparatus, and non-transitory computer-readable medium described above, the reference signal resources of each of the first subset of time resources and the second subset of time resources occupy a same number of frequency tones. In some examples of the method, apparatus, and non-transitory computer-readable medium described above, each of the first subset of time resources and the second subset of time resources may have a same reference signal waveform.

In some examples of the method, apparatus, and non-transitory computer-readable medium described above, the first subset of time resources include reference signal resources in a first subset of tones and a second subset of tones, the second subset of time resources include reference signal resources in the first subset of tones and a third subset of tones. In some examples of the method, apparatus, and non-transitory computer-readable medium described above, the first subset of tones in the first subset of time resources and the second subset of time resources may have a same reference signal waveform, and the second subset of tones in the first subset of time resources and the third subset of tones in the second subset of time resources may have different reference signal waveforms. In some examples of the method, apparatus, and non-transitory computer-readable medium described above, the first subset of time resources and the second subset of time resources may have different reference signal waveforms. In some examples of the method, apparatus, and non-transitory computer-readable medium described above, the first subset of time resources and the second subset of time resources may have different portions of a reference signal sequence.

In some examples of the method, apparatus, and non-transitory computer-readable medium described above, the second set of wireless resources comprise PBCH resources and the first set of wireless resources comprise synchronization signal resources. In some examples of the method, apparatus, and non-transitory computer-readable medium described above, the PBCH resources comprise a first symbol of time resources and a third symbol of time resources, the synchronization signal resources comprise a second symbol of time resources and a fourth symbol of time resources, the second symbol of time resources located between the first symbol of time resources and the third symbol of time resources, and the fourth symbol of time resources located after the third symbol of time resources. In some examples of the method, apparatus, and non-transitory computer-readable medium described above, the second symbol of time resources may be for transmission of a secondary synchronization signal and the fourth symbol of time resources may be for transmission of a primary synchronization signal. In some examples of the method, apparatus, and non-transitory computer-readable medium described above, the reference signal transmissions comprise DMRS transmissions.

In some examples of the method, apparatus, and non-transitory computer-readable medium described above, the first set of wireless resources comprises a first set of frequency resources that span a first bandwidth and the second set of wireless resources comprises a second set of frequency resources that span a second bandwidth that may be larger than the first bandwidth and that overlaps at least a portion of the first bandwidth, and wherein the reference signal resources are non-uniformly distributed across the second set of frequency resources. In some examples of the method, apparatus, and non-transitory computer-readable medium described above, the reference signal resources may be non-uniformly distributed across the first subset of time resources and the second subset of time resources, the reference signal resources within the first subset of time resources occupy different frequency resources than at least a portion of reference signal resources within the second subset of time resources, or any combination thereof.

Some examples of the method, apparatus, and non-transitory computer-readable medium described above may further include processes, features, means, or instructions for determining one or more of a transmitter identification, timing information, or synchronization signal transmission configuration based at least in part on the received reference signal transmissions.

A method of wireless communication is described. The method may include identifying a first set of wireless resources for synchronization signal transmissions and a second set of wireless resources for broadcast channel transmissions, identifying locations of reference signal resources within the second set of wireless resources, receiving reference signal transmissions over the reference signal resources, and determining one or more of a transmitter identification, timing information, or synchronization signal transmission configuration based at least in part on the received reference signal transmissions.

An apparatus for wireless communication is described. The apparatus may include means for identifying a first set of wireless resources for synchronization signal transmissions and a second set of wireless resources for broadcast channel transmissions, means for identifying locations of reference signal resources within the second set of wireless resources, means for receiving reference signal transmissions over the reference signal resources, and means for determining one or more of a transmitter identification, timing information, or synchronization signal transmission configuration based at least in part on the received reference signal transmissions.

Another apparatus for wireless communication is described. The apparatus may include a processor, memory in electronic communication with the processor, and instructions stored in the memory. The instructions may be operable to cause the processor to identify a first set of wireless resources for synchronization signal transmissions and a second set of wireless resources for broadcast channel transmissions, identify locations of reference signal resources within the second set of wireless resources, receive reference signal transmissions over the reference signal resources, and determine one or more of a transmitter identification, timing information, or synchronization signal transmission configuration based at least in part on the received reference signal transmissions.

A non-transitory computer readable medium for wireless communication is described. The non-transitory computer-readable medium may include instructions operable to cause a processor to identify a first set of wireless resources for synchronization signal transmissions and a second set of wireless resources for broadcast channel transmissions, identify locations of reference signal resources within the second set of wireless resources, receive reference signal transmissions over the reference signal resources, and determine one or more of a transmitter identification, timing information, or synchronization signal transmission configuration based at least in part on the received reference signal transmissions.

In some examples of the method, apparatus, and non-transitory computer-readable medium described above, the determining comprises: determining a cell identification of a base station based at least in part on a reference signal sequence of the reference signal transmissions.

Some examples of the method, apparatus, and non-transitory computer-readable medium described above may further include processes, features, means, or instructions for receiving synchronization signal transmissions over the first set of wireless resources. Some examples of the method, apparatus, and non-transitory computer-readable medium described above may further include processes, features, means, or instructions for determining a cell identification of a base station based at least in part on the synchronization signal transmissions, and wherein the receiving the reference signal transmissions may be based at least in part on the cell identification of the base station.

In some examples of the method, apparatus, and non-transitory computer-readable medium described above, information related to a synchronization signal burst index within a synchronization signal burst set may be determined based at least in part on a reference signal sequence of the reference signal transmissions. In some examples of the method, apparatus, and non-transitory computer-readable medium described above, information related to a synchronization signal block index within a synchronization signal burst may be determined based at least in part on a reference signal sequence of the reference signal transmissions. In some examples of the method, apparatus, and non-transitory computer-readable medium described above, the determining comprises: determining a redundancy version of a broadcast channel transmission transmitted in the second set of wireless resources based at least in part on a reference signal sequence of the reference signal transmissions. In some examples of the method, apparatus, and non-transitory computer-readable medium described above, a configuration of one or more of a synchronization signal burst, a synchronization signal burst set, or a periodicity of synchronization signal transmissions may be determined based at least in part on a reference signal sequence of the reference signal transmissions.

In some examples of the method, apparatus, and non-transitory computer-readable medium described above, the determination may be based at least in part on a mapping between a reference signal sequence of the reference signal transmissions and one or more of the transmitter identification, the timing information, or the synchronization signal transmission configuration. In some examples of the method, apparatus, and non-transitory computer-readable medium described above, the determining may be based at least in part on a mapping between the locations of the reference signal resources and one or more of the transmitter identification, the timing information, or the synchronization signal transmission configuration.

In some examples of the method, apparatus, and non-transitory computer-readable medium described above, the first set of wireless resources comprises a first set of frequency resources that span a first bandwidth and the second set of wireless resources comprises a second set of frequency resources that span a second bandwidth that overlaps at least a portion of the first bandwidth, and non-uniformly distributed the reference signal resources may be identified across the second set of frequency resources. In some examples of the method, apparatus, and non-transitory computer-readable medium described above, the second bandwidth that may be larger than the first bandwidth.

In some examples of the method, apparatus, and non-transitory computer-readable medium described above, the second set of wireless resources comprise PBCH resources and the first set of wireless resources comprise synchronization signal resources. In some examples of the method, apparatus, and non-transitory computer-readable medium described above, the PBCH resources comprise a first symbol of time resources and a third symbol of time resources, the synchronization signal resources comprise a second symbol of time resources and a fourth symbol of time resources, the second symbol of time resources located between the first symbol of time resources and the third symbol of time resources, and the fourth symbol of time resources located after the third symbol of time resources. In some examples of the method, apparatus, and non-transitory computer-readable medium described above, the second symbol of time resources may be for transmission of a secondary synchronization signal and the fourth symbol of time resources may be for transmission of a primary synchronization signal. In some examples of the method, apparatus, and non-transitory computer-readable medium described above, the reference signal transmissions comprise DMRS transmissions.

In some examples of the method, apparatus, and non-transitory computer-readable medium described above, the second set of wireless resources comprises a first subset of time resources and a second subset of time resources, and the reference signal resources may be non-uniformly distributed across the first subset of time resources and the second subset of time resources, the reference signal resources within the first subset of time resources occupy different frequency resources than at least a portion of reference signal resources within the second subset of time resources, or any combination thereof.

In some examples of the method, apparatus, and non-transitory computer-readable medium described above, the second set of wireless resources comprises a first subset of time resources and a second subset of time resources, and locations of reference signal resources may be identified within the first subset of time resources and the second subset of time resources. Some examples of the method, apparatus, and non-transitory computer-readable medium described above may further include processes, features, means, or instructions for determining a waveform of the reference signal transmissions based at least in part on the locations of the reference signal resources. Some examples of the method, apparatus, and non-transitory computer-readable medium described above may further include processes, features, means, or instructions for performing a channel estimation based at least in part on the received reference signal transmissions and the determined waveform of the reference signal transmissions.

A method of wireless communication is described. The method may include configuring a first set of wireless resources for synchronization signal transmissions and a second set of wireless resources for broadcast channel transmissions, the first set of wireless resources comprising a first set of frequency resources that span a first bandwidth and the second set of wireless resources comprising a second set of frequency resources that span a second bandwidth that overlaps at least a portion of the first bandwidth, configuring reference signal resources within the second set of wireless resources, locations of the reference signal resources based at least in part on one or more of a time resource location within the second set of wireless resources or a frequency resource location within the second set of wireless resources relative to the first bandwidth, and transmitting reference signal transmissions using the reference signal resources and synchronization signal transmissions using the first set of wireless resources.

An apparatus for wireless communication is described. The apparatus may include means for configuring a first set of wireless resources for synchronization signal transmissions and a second set of wireless resources for broadcast channel transmissions, the first set of wireless resources comprising a first set of frequency resources that span a first bandwidth and the second set of wireless resources comprising a second set of frequency resources that span a second bandwidth that overlaps at least a portion of the first bandwidth, means for configuring reference signal resources within the second set of wireless resources, locations of the reference signal resources based at least in part on one or more of a time resource location within the second set of wireless resources or a frequency resource location within the second set of wireless resources relative to the first bandwidth, and means for transmitting reference signal transmissions using the reference signal resources and synchronization signal transmissions using the first set of wireless resources.

Another apparatus for wireless communication is described. The apparatus may include a processor, memory in electronic communication with the processor, and instructions stored in the memory. The instructions may be operable to cause the processor to configure a first set of wireless resources for synchronization signal transmissions and a second set of wireless resources for broadcast channel transmissions, the first set of wireless resources comprising a first set of frequency resources that span a first bandwidth and the second set of wireless resources comprising a second set of frequency resources that span a second bandwidth that overlaps at least a portion of the first bandwidth, configure reference signal resources within the second set of wireless resources, locations of the reference signal resources based at least in part on one or more of a time resource location within the second set of wireless resources or a frequency resource location within the second set of wireless resources relative to the first bandwidth, and transmit reference signal transmissions using the reference signal resources and synchronization signal transmissions using the first set of wireless resources.

A non-transitory computer readable medium for wireless communication is described. The non-transitory computer-readable medium may include instructions operable to cause a processor to configure a first set of wireless resources for synchronization signal transmissions and a second set of wireless resources for broadcast channel transmissions, the first set of wireless resources comprising a first set of frequency resources that span a first bandwidth and the second set of wireless resources comprising a second set of frequency resources that span a second bandwidth that overlaps at least a portion of the first bandwidth, configure reference signal resources within the second set of wireless resources, locations of the reference signal resources based at least in part on one or more of a time resource location within the second set of wireless resources or a frequency resource location within the second set of wireless resources relative to the first bandwidth, and transmit reference signal transmissions using the reference signal resources and synchronization signal transmissions using the first set of wireless resources.

In some examples of the method, apparatus, and non-transitory computer-readable medium described above, the second bandwidth may be larger than the first bandwidth. In some examples of the method, apparatus, and non-transitory computer-readable medium described above, the locations of the reference signal resources may be configured to be non-uniformly distributed reference signal resources across the second set of frequency resources.

In some examples of the method, apparatus, and non-transitory computer-readable medium described above, the second set of frequency resources comprise a first subset of frequency resources that may be overlapping with the first bandwidth and a second subset of frequency resources that may be non-overlapping with the first bandwidth, and the second subset of frequency resources may have a higher density of reference signal resources than the first subset of frequency resources. In some examples of the method, apparatus, and non-transitory computer-readable medium described above, the first subset of frequency resources may be devoid of reference signal resources.

In some examples of the method, apparatus, and non-transitory computer-readable medium described above, the second set of wireless resources comprises a first subset of time resources and a second subset of time resources, and the reference signal resources may be non-uniformly distributed across the first subset of time resources and the second subset of time resources. In some examples of the method, apparatus, and non-transitory computer-readable medium described above, the second set of wireless resources comprises a first subset of time resources and a second subset of time resources, and the reference signal resources within the first subset of time resources occupy different frequency resources than at least a portion of reference signal resources within the second subset of time resources. In some examples of the method, apparatus, and non-transitory computer-readable medium described above, the second set of wireless resources comprises a first subset of time resources and a second subset of time resources, and at least a portion of the reference signal resources within the first subset of time resources and the second subset of time resources occupy common frequency tones.

In some examples of the method, apparatus, and non-transitory computer-readable medium described above, the second set of wireless resources comprise PBCH resources and the first set of wireless resources comprise synchronization signal resources. In some examples of the method, apparatus, and non-transitory computer-readable medium described above, the PBCH resources comprise a first symbol of time resources and a third symbol of time resources, the synchronization signal resources comprise a second symbol of time resources and a fourth symbol of time resources, the second symbol of time resources located between the first symbol of time resources and the third symbol of time resources, and the fourth symbol of time resources located after the third symbol of time resources. In some examples of the method, apparatus, and non-transitory computer-readable medium described above, the second symbol of time resources may be for transmission of a secondary synchronization signal and the fourth symbol of time resources may be for transmission of a primary synchronization signal.

In some examples of the method, apparatus, and non-transitory computer-readable medium described above, the reference signal transmissions comprise DMRS transmissions. Some examples of the method, apparatus, and non-transitory computer-readable medium described above may further include processes, features, means, or instructions for providing an indication of one or more of a transmitter identification, timing information, or synchronization signal transmission configuration based at least in part on the reference signal transmissions.

A method of wireless communication is described. The method may include configuring a first set of wireless resources for synchronization signal transmissions and a second set of wireless resources for broadcast channel transmissions, the second set of wireless resources comprising a first subset of time resources and a second subset of time resources, configuring locations of reference signal resources within the first subset of time resources and the second subset of time resources, determining a waveform of a reference signal transmission based at least in part on the locations of the reference signal resources, and transmitting the reference signal over the reference signal resources.

An apparatus for wireless communication is described. The apparatus may include means for configuring a first set of wireless resources for synchronization signal transmissions and a second set of wireless resources for broadcast channel transmissions, the second set of wireless resources comprising a first subset of time resources and a second subset of time resources, means for configuring locations of reference signal resources within the first subset of time resources and the second subset of time resources, means for determining a waveform of a reference signal transmission based at least in part on the locations of the reference signal resources, and means for transmitting the reference signal over the reference signal resources.

Another apparatus for wireless communication is described. The apparatus may include a processor, memory in electronic communication with the processor, and instructions stored in the memory. The instructions may be operable to cause the processor to configure a first set of wireless resources for synchronization signal transmissions and a second set of wireless resources for broadcast channel transmissions, the second set of wireless resources comprising a first subset of time resources and a second subset of time resources, configure locations of reference signal resources within the first subset of time resources and the second subset of time resources, determine a waveform of a reference signal transmission based at least in part on the locations of the reference signal resources, and transmit the reference signal over the reference signal resources.

A non-transitory computer readable medium for wireless communication is described. The non-transitory computer-readable medium may include instructions operable to cause a processor to configure a first set of wireless resources for synchronization signal transmissions and a second set of wireless resources for broadcast channel transmissions, the second set of wireless resources comprising a first subset of time resources and a second subset of time resources, configure locations of reference signal resources within the first subset of time resources and the second subset of time resources, determine a waveform of a reference signal transmission based at least in part on the locations of the reference signal resources, and transmit the reference signal over the reference signal resources.

In some examples of the method, apparatus, and non-transitory computer-readable medium described above, the reference signal resources of each of the first subset of time resources and the second subset of time resources occupy a same number of frequency tones. In some examples of the method, apparatus, and non-transitory computer-readable medium described above, each of the first subset of time resources and the second subset of time resources may have a same reference signal waveform.

In some examples of the method, apparatus, and non-transitory computer-readable medium described above, the first subset of time resources include reference signal resources in a first subset of tones and a second subset of tones, the second subset of time resources include reference signal resources in the first subset of tones and a third subset of tones. In some examples of the method, apparatus, and non-transitory computer-readable medium described above, the first subset of tones in the first subset of time resources and the second subset of time resources may have a same reference signal waveform, and the second subset of tones in the first subset of time resources and the third subset of tones in the second subset of time resources may have different reference signal waveforms. In some examples of the method, apparatus, and non-transitory computer-readable medium described above, the first subset of time resources and the second subset of time resources may have different reference signal waveforms. In some examples of the method, apparatus, and non-transitory computer-readable medium described above, the first subset of time resources and the second subset of time resources may have different portions of a reference signal sequence.

In some examples of the method, apparatus, and non-transitory computer-readable medium described above, the second set of wireless resources comprise PBCH resources and the first set of wireless resources comprise synchronization signal resources. In some examples of the method, apparatus, and non-transitory computer-readable medium described above, the PBCH resources comprise a first symbol of time resources and a third symbol of time resources, the synchronization signal resources comprise a second symbol of time resources and a fourth symbol of time resources, the second symbol of time resources located between the first symbol of time resources and the third symbol of time resources, and the fourth symbol of time resources located after the third symbol of time resources. In some examples of the method, apparatus, and non-transitory computer-readable medium described above, the second symbol of time resources may be for transmission of a secondary synchronization signal and the fourth symbol of time resources may be for transmission of a primary synchronization signal.

In some examples of the method, apparatus, and non-transitory computer-readable medium described above, the reference signal transmissions comprise DMRS transmissions. In some examples of the method, apparatus, and non-transitory computer-readable medium described above, the first set of wireless resources comprises a first set of frequency resources that span a first bandwidth and the second set of wireless resources comprises a second set of frequency resources that span a second bandwidth that may be larger than the first bandwidth and that overlaps at least a portion of the first bandwidth, and wherein the method further comprises: configuring non-uniformly distributed the reference signal resources across the second set of frequency resources.

In some examples of the method, apparatus, and non-transitory computer-readable medium described above, the reference signal resources may be non-uniformly distributed across the first subset of time resources and the second subset of time resources, the reference signal resources within the first subset of time resources occupy different frequency resources than at least a portion of reference signal resources within the second subset of time resources, or any combination thereof.

A method of wireless communication is described. The method may include configuring a first set of wireless resources for synchronization signal transmissions and a second set of wireless resources for broadcast channel transmissions, configuring locations of reference signal resources within the second set of wireless resources, and transmitting reference signal transmissions over the reference signal resources, wherein the reference signal transmissions, the locations of the reference signal resources, or any combination thereof provide an indication of one or more of a transmitter identification, timing information, or synchronization signal transmission configuration.

An apparatus for wireless communication is described. The apparatus may include means for configuring a first set of wireless resources for synchronization signal transmissions and a second set of wireless resources for broadcast channel transmissions, means for configuring locations of reference signal resources within the second set of wireless resources, and means for transmitting reference signal transmissions over the reference signal resources, wherein the reference signal transmissions, the locations of the reference signal resources, or any combination thereof provide an indication of one or more of a transmitter identification, timing information, or synchronization signal transmission configuration.

Another apparatus for wireless communication is described. The apparatus may include a processor, memory in electronic communication with the processor, and instructions stored in the memory. The instructions may be operable to cause the processor to configure a first set of wireless resources for synchronization signal transmissions and a second set of wireless resources for broadcast channel transmissions, configure locations of reference signal resources within the second set of wireless resources, and transmit reference signal transmissions over the reference signal resources, wherein the reference signal transmissions, the locations of the reference signal resources, or any combination thereof provide an indication of one or more of a transmitter identification, timing information, or synchronization signal transmission configuration.

A non-transitory computer readable medium for wireless communication is described. The non-transitory computer-readable medium may include instructions operable to cause a processor to configure a first set of wireless resources for synchronization signal transmissions and a second set of wireless resources for broadcast channel transmissions, configure locations of reference signal resources within the second set of wireless resources, and transmit reference signal transmissions over the reference signal resources, wherein the reference signal transmissions, the locations of the reference signal resources, or any combination thereof provide an indication of one or more of a transmitter identification, timing information, or synchronization signal transmission configuration.

In some examples of the method, apparatus, and non-transitory computer-readable medium described above, one or more of a cell identification of a base station, synchronization signal burst index within a synchronization signal burst set, a synchronization signal block index within a synchronization signal burst, a redundancy version of a broadcast channel transmission transmitted in the second set of wireless resources, a configuration of one or more of a synchronization signal burst, a synchronization signal burst set, a periodicity of synchronization signal transmissions, or any combination thereof may be mapped to a reference signal sequence of the reference signal transmissions.

In some examples of the method, apparatus, and non-transitory computer-readable medium described above, the first set of wireless resources comprises a first set of frequency resources that span a first bandwidth and the second set of wireless resources comprises a second set of frequency resources that span a second bandwidth that may be larger than the first bandwidth and that overlaps at least a portion of the first bandwidth, and wherein the method further comprises: configuring non-uniformly distributed the reference signal resources across the second set of frequency resources.

In some examples of the method, apparatus, and non-transitory computer-readable medium described above, the second set of wireless resources comprise PBCH resources and the first set of wireless resources comprise synchronization signal resources. In some examples of the method, apparatus, and non-transitory computer-readable medium described above, the PBCH resources comprise a first symbol of time resources and a third symbol of time resources, the synchronization signal resources comprise a second symbol of time resources and a fourth symbol of time resources, the second symbol of time resources located between the first symbol of time resources and the third symbol of time resources, and the fourth symbol of time resources located after the third symbol of time resources. In some examples of the method, apparatus, and non-transitory computer-readable medium described above, the second symbol of time resources may be for transmission of a secondary synchronization signal and the fourth symbol of time resources may be for transmission of a primary synchronization signal. In some examples of the method, apparatus, and non-transitory computer-readable medium described above, the reference signal transmissions comprise DMRS transmissions.

DETAILED DESCRIPTION

Figure 1:
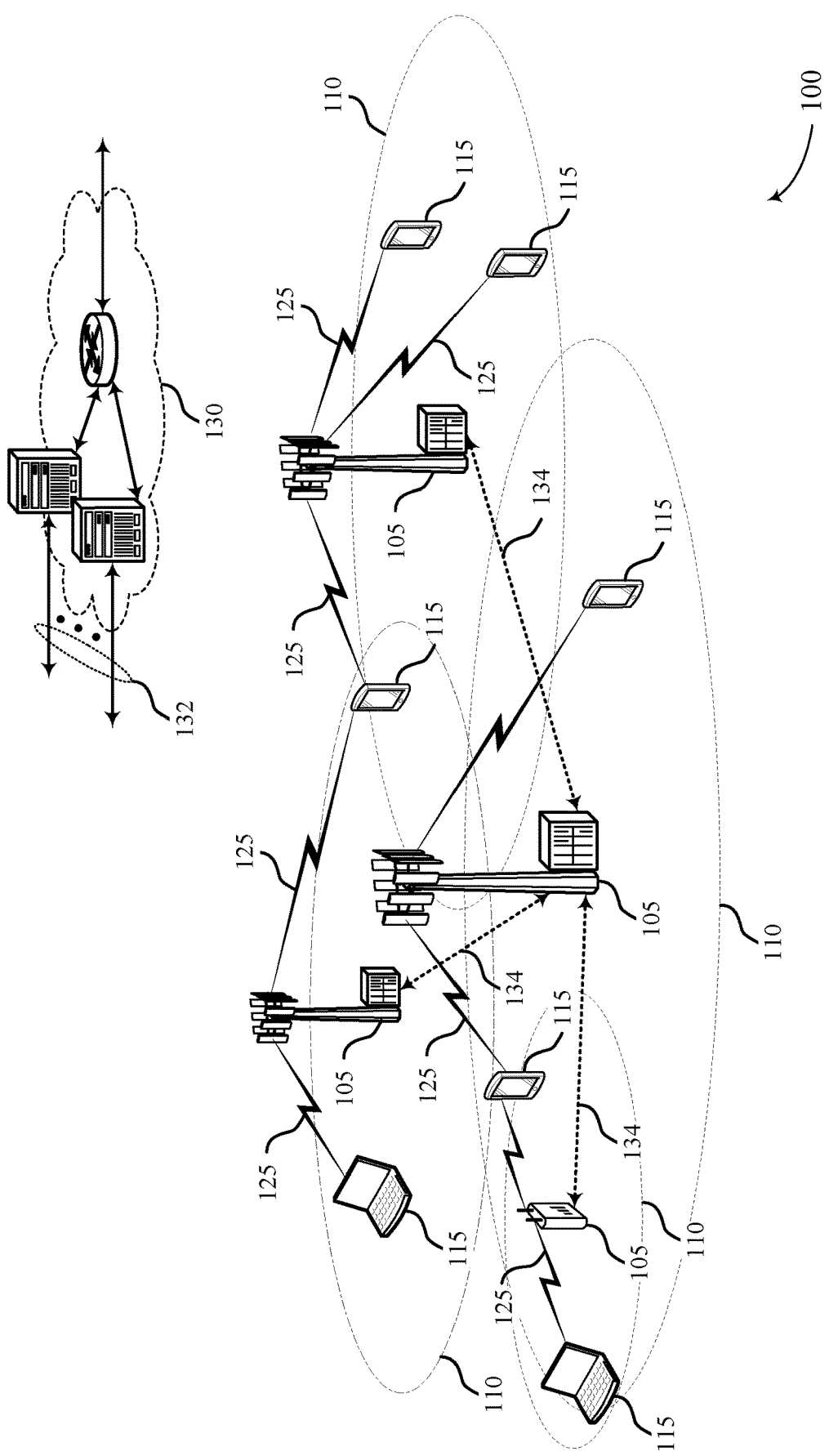
FIG. 1 illustrates an example of a system for wireless communication that supports reference signal schemes in wireless communications in accordance with aspects of the present disclosure.

Wireless communications systems as described herein may be configured to provide synchronization signal (SS) blocks in which synchronization signals and physical broadcast channel (PBCH) transmissions may be transmitted, to aid a user equipment (UE) in initial acquisition and communication with a base station. In some examples, PBCH transmissions may be transmitted in a subset of SS block time resources (e.g., in two symbols of an SS block), and synchronization signals (e.g., primary synchronization signal (PSS) and secondary synchronization signal (SSS)) may be transmitted in another subset of SS block time resources. In deployments that use millimeter wave (mmW) transmission frequencies, multiple SS blocks may be transmitted in different directions using beam sweeping in a SS burst, and SS bursts may be periodically transmitted according to a SS burst set. In cases where a base station may transmit omni-directionally a SS block may be periodically transmitted according to a configured periodicity.

In some cases, PBCH transmissions may be demodulated using SS transmissions, in which the SS transmissions are used for channel estimation, which may allow a UE to demodulate the PBCH transmissions. In some examples, PBCH transmissions may be transmitted using a larger frequency bandwidth than SS transmissions, in which case one or more reference signal transmissions (e.g., demodulation reference signal (DMRS) transmissions) in the PBCH transmissions may be useful to provide reliable demodulation of the PBCH transmissions. In some examples, PBCH transmissions may be demodulated using reference signal transmissions, SS transmissions, or combinations thereof.

In some cases, reference signals (e.g., DMRS) may be transmitted using tones within the PBCH time resources, and the locations of the tones may be selected to provide efficient demodulation using relatively few transmission resources. In some cases, as indicated above, a bandwidth of the PBCH transmissions may be greater than a bandwidth of SS transmissions, and DMRS may be transmitted at a higher density for portions of the PBCH transmission bandwidth that are outside of the SS transmission bandwidth. In some cases, different DMRS tones may be used for different PBCH time resources.

In some cases, a DMRS waveform may be configured across PBCH time resources (e.g., across two or more OFDM symbols that contain PBCH transmissions). In some examples, a same DMRS sequence may be used for each PBCH symbol, and each PBCH symbol may include a same number of DMRS tones. In other examples, PBCH symbols may include a subset of common DMRS tones across PBCH symbols and a subset of DMRS tones that are different across PBCH symbols. In such examples, the common DMRS tones may share a same DMRS sequence, and the other DMRS tones may have a different sequence. In still further examples, the DMRS waveforms for different symbols of PBCH transmissions may be completely different. In some examples, different DMRS sequences may be constructed by splitting a long base sequence among different PBCH time resources (e.g., a long Zadoff-Chu sequence, m-sequence, or cyclic shifts thereof). In some examples, reference signal sequences (e.g., DMRS sequences), tone locations, or combinations thereof may be used to convey one or more of identification information, timing information, configuration information, or any combination thereof.

Aspects of the disclosure are initially described in the context of a wireless communications system. Examples of various channel configurations and resource allocation schemes are described. Aspects of the disclosure are further illustrated by and described with reference to apparatus diagrams, system diagrams, and flowcharts that relate to reference signal schemes in wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Base stations 105 and UEs 115 may be configured to use SS blocks with PBCH and SS transmissions that use different time resources (e.g., OFDM symbols) within an SS block.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105 or next generation NodeBs (gNBs).

The core network 130 may provide user authentication, access authorization, tracking, Internet Protocol (IP) connectivity, and other access, routing, or mobility functions. At least some of the network devices, such as base station 105 may include subcomponents such as an access network entity or an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

As discussed above, in some examples base station 105 may transmit SS blocks which may be used by UEs 115 in system acquisition. The SS blocks may include PBCH transmissions and SS transmissions, which may be transmitted in different time resources of an SS block. In cases, where a base station 105 uses beamforming, an SS burst may be beam-swept by a base station 105 with a periodicity that is configured in a SS burst set configuration. In some cases, PBCH transmissions may be demodulated using SS transmissions, in which the SS transmissions are used for channel estimation, which may allow a UE to demodulate the PBCH transmissions. In some examples, PBCH transmissions may be transmitted using a larger frequency bandwidth than SS transmissions, in which case one or more reference signal transmissions (e.g., demodulation reference signal (DMRS) transmissions) in the PBCH transmissions may be useful to provide reliable demodulation of the PBCH transmissions. In some examples, PBCH transmissions may be demodulated using reference signal transmissions, SS transmissions, or combinations thereof.

Figure 2:
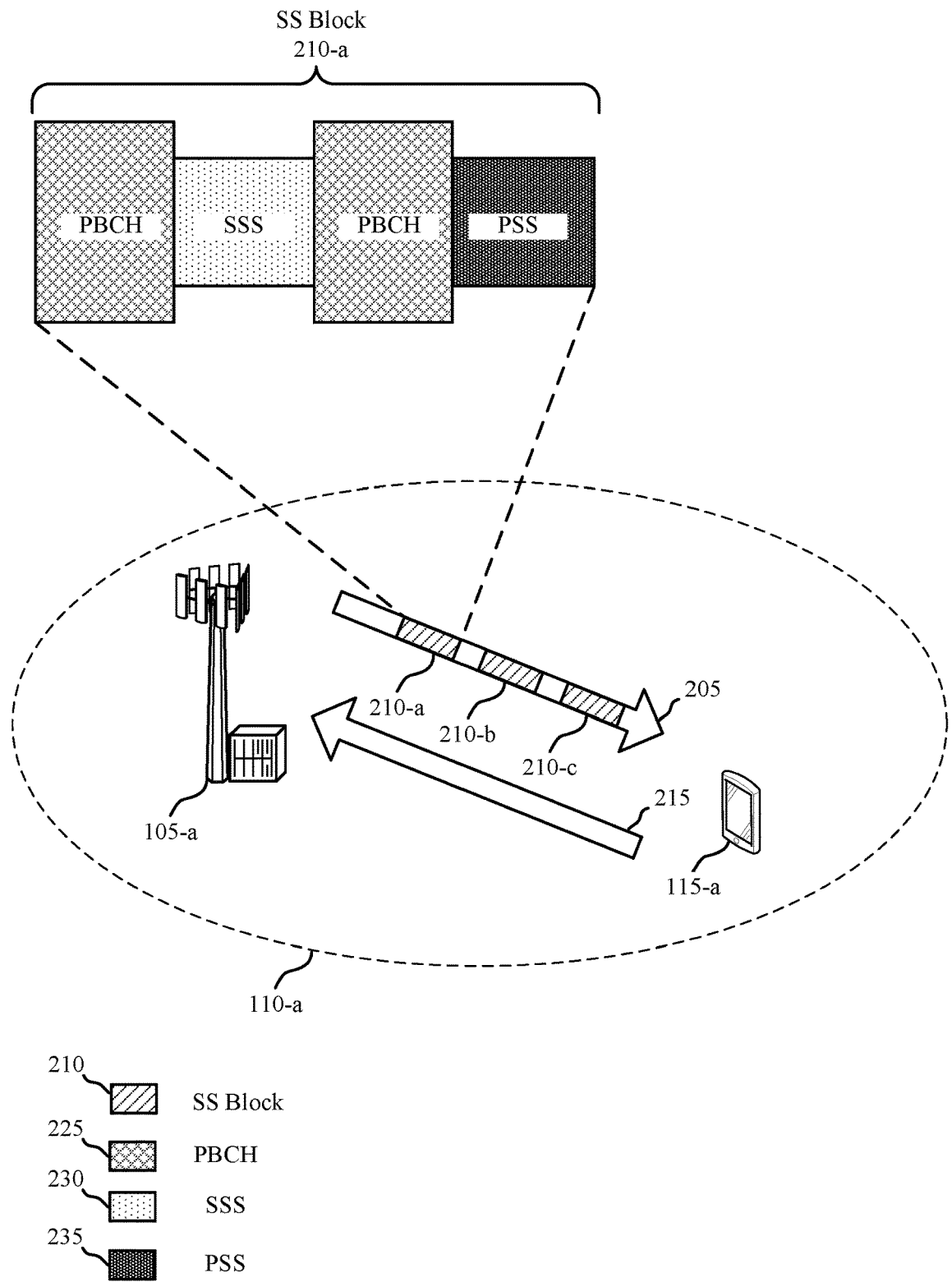
FIG. 2 illustrates an example of a wireless communication system that supports SS block and reference signal schemes in wireless communications in accordance with aspects of the present disclosure.

FIG. 2 illustrates an example of a wireless communications system 200 that supports reference signal schemes in wireless communications in accordance with various aspects of the present disclosure. Wireless communications system 200 includes base station 105-a and UE 115-a, which may be examples of aspects of the corresponding devices as described above with reference to FIG. 1. In the example of FIG. 2, the wireless communications system 200 may operate according to a radio access technology (RAT) such as a LTE, 5G, or NR RAT, although techniques described herein may be applied to any RAT and to systems that may concurrently use two or more different RATs.

Base station 105-a may communicate with UE 115-a over a downlink carrier 205 and an uplink carrier 215. In some cases, base station 105-a may allocate resources for SS block 210 transmissions, which may be periodically transmitted and may be used by UE 115-a for system acquisition. In this example, SS blocks 210 may include a first SS block 210-a, a second SS block 210-b, and a third SS block 210-c. In some cases, the periodicity of the SS blocks 210 may be configured according to an established standard. In other the periodicity of the SS blocks 210 may be configured by the base station 105-a and information related to the timing or configuration of the SS blocks 210 may be provided with the SS blocks 210. In some cases, base station 105-a may transmit using mmW frequencies, and SS blocks 210 may be transmitted using beam sweeping.

Each of the SS blocks 210 in this example may include four symbols. Two of the symbols, namely the first and third symbols in this example, may include PBCH transmissions 225. The other two symbols, which are the second and fourth symbols in this example, may include SS transmissions, such as a SSS transmission 230 and a PSS transmission 235. As indicated above, in some examples the PBCH transmissions 225 may have a larger frequency bandwidth than SSS transmission 230 or PSS transmission 235, although the frequency bandwidths may be the same in other examples. In some examples, PBCH transmissions 225 may use 288 frequency tones and occupy four resource blocks (RBs), and SSS transmission 230 and PSS transmission 235 may each use 127 tones and occupy two RBs. The frequency of the SSS transmission 230 and the PSS transmission 235 may at least partially overlap with the frequency of the PBCH transmissions 225. Also as discussed above, in some cases, base station 105-a may use beam sweeping to transmit SS bursts.

Figure 3:
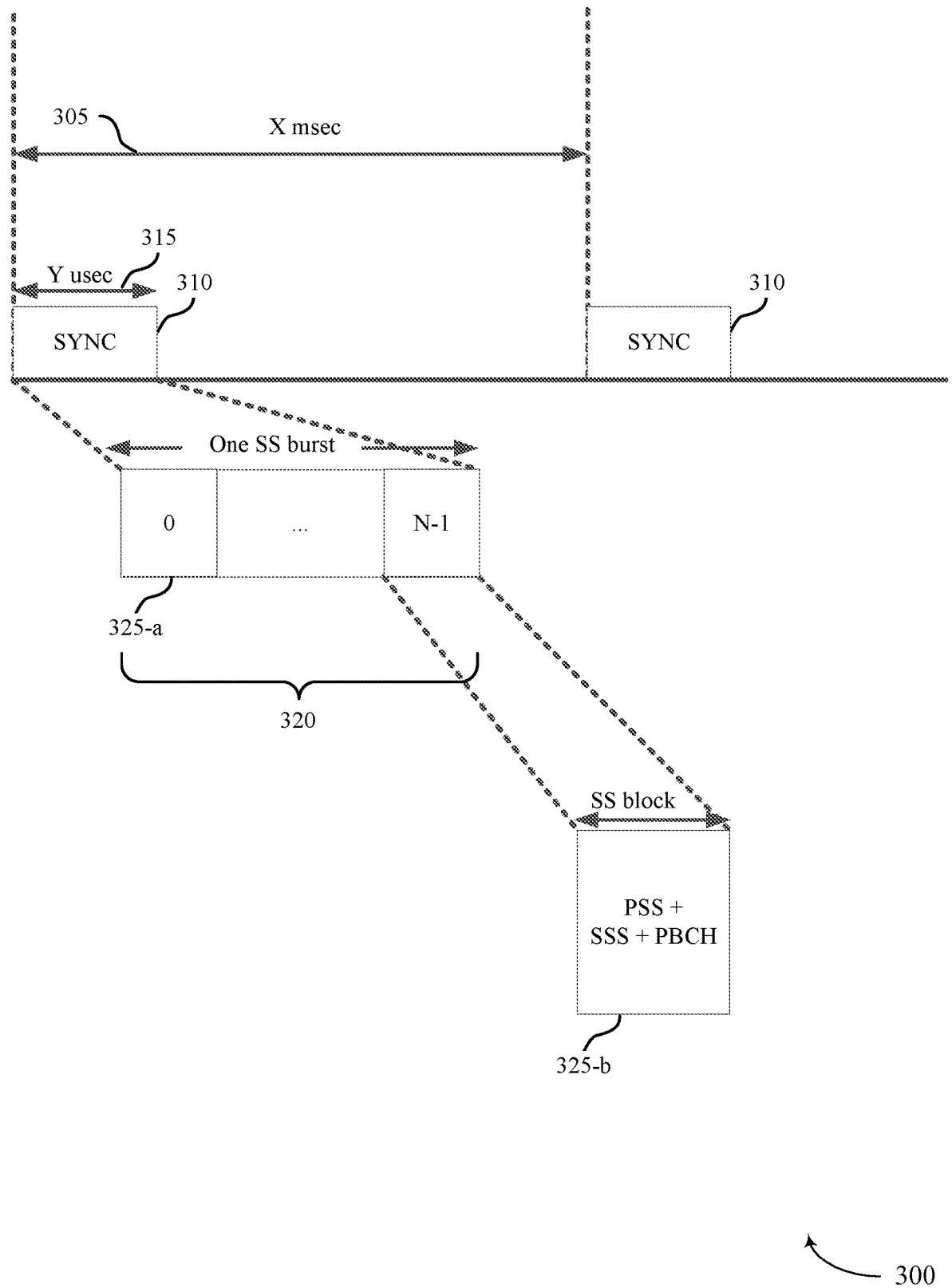
FIG. 3 illustrates an example of synchronization signal (SS) burst resources that support reference signal schemes in wireless communications in accordance with aspects of the present disclosure.

FIG. 3 illustrates an example of SS burst resources 300 that support reference signal schemes in wireless communications in accordance with various aspects of the present disclosure. In some examples, SS burst resources 300 may implement aspects of wireless communications systems 100 or 200 of FIG. 1 or 2. In the example, of FIG. 3, a periodic synchronization transmission 310 may be transmitted by a base station. In this example, a synchronization periodicity of X milliseconds 305 may be configured for a base station, in which the synchronization may have a duration of Y microseconds 315.

In examples that use mmW frequencies, synchronization transmission 310 may include a SS burst 320, which may include a number of SS blocks 325 that may be transmitted using different transmission beams in a beam sweep pattern, starting with a first SS block 325-a transmitted in a first direction, and ending with an N–1$^{th}$ SS block 325-b transmitted in an N–1$^{th}$ direction. Each SS block 325-b may include PBCH transmissions and SS transmissions, such as discussed with reference to FIG. 2. As indicated above, a UE receiving PBCH transmission in a SS block 425 may perform channel estimation and demodulation of the PBCH transmissions. In some cases, the SSS transmitted within the same SS block 425 as the PBCH transmission, and time division multiplexed with the PBCH transmission, may be used for channel estimation and demodulation of the PBCH transmissions. In such cases, the base station may use transmission parameters, such as antenna ports, that are the same between the SS transmission and the PBCH transmissions. Additionally, PBCH transmissions may include, as indicated above, a dedicated DMRS signal transmitted within the same symbol as PBCH multiplexed in the frequency domain. Thus, a UE receiving the transmissions may perform demodulation at least in part based on the SSS signal, the DMRS transmissions, or combinations thereof. In some cases, a density of DMRS transmissions may be reduced for portions of the PBCH and SS transmissions that use overlapping bandwidth, and an increased density of DMRS transmissions may be used for non-overlapping bandwidths. Additionally, in some cases, a SS transmission may be transmitted from one port (e.g., antenna port P0), and PBCH may be transmitted from two antenna ports, such as one common with the SS transmission port and one additional port (e.g., antenna ports P0 and P1). In such cases, one or more DMRS tones may be configured in the overlapping bandwidths of the PBCH and SS transmissions that may allow for channel estimation of the additional antenna port.

Figure 4:
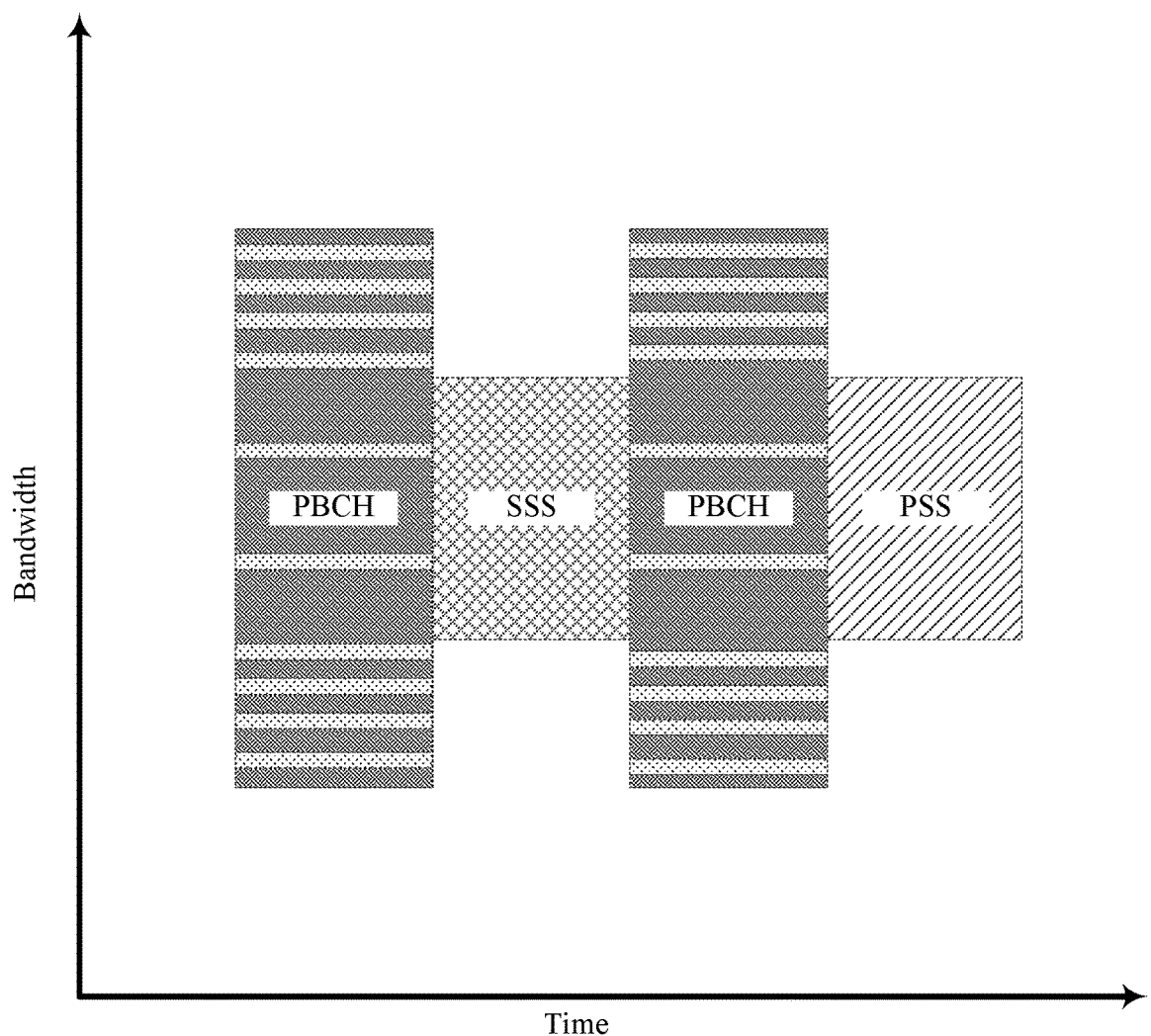
FIG. 4 illustrates an example of SS block resources that support reference signal schemes in wireless communications in accordance with aspects of the present disclosure.
Figure 4:
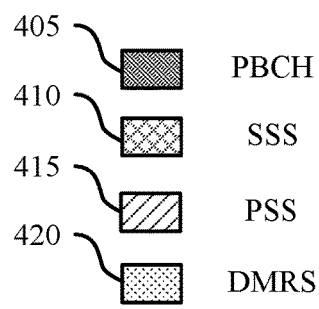

FIG. 4 illustrates an example of SS block resources 400 that support reference signal schemes in wireless communications in accordance with various aspects of the present disclosure. In some examples, SS block resources 400 may implement aspects of wireless communications systems 100 and 200. In this example, SS block resources 400 may include four symbols, two of which may be used to transmit PBCH transmissions 405, one may be used for SSS transmissions 410, and one may be used for PSS transmissions 415. As discussed above, PBCH transmissions 405 may include reference signal transmissions, such as DMRS tones 420 or transmissions.

In the example of FIG. 4, within the PBCH transmission 405 symbols, a non-uniform density of the DMRS tones may be used. In this example, the portions of the PBCH transmission 405 bandwidth that overlap with SSS transmission 410 bandwidth may have a reduced density of DMRS tones 420, and non-overlapping bandwidths may have an increased density of DMRS tones 420. As discussed above, a UE may use, in some examples, SSS transmissions 410 for demodulation of PBCH transmissions 405, and thus the reduced density of DMRS tones 420 in the bandwidth of the SSS transmissions 410 may still provide sufficient channel estimation for demodulating the PBCH transmissions 405. In some cases, DMRS tones 420 may be completely omitted from overlapping bandwidth, and SSS transmissions 410 may be used for PBCH transmission 405 demodulation. By providing reduced DMRS tone 420 density, additional PBCH resources may be available for broadcast transmissions that may be transmitted in the PBCH transmissions 405.

Figure 5:
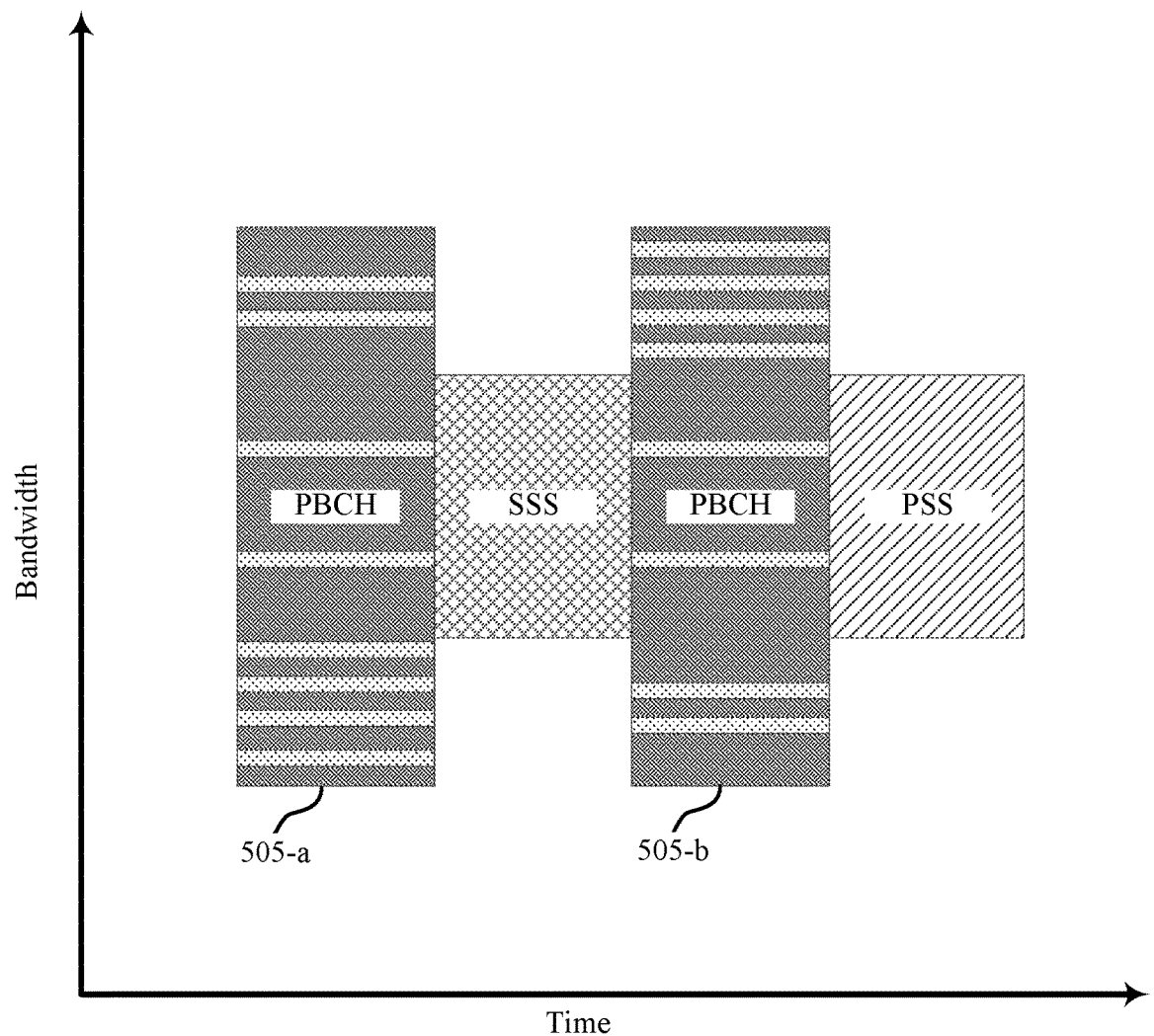
FIG. 5 illustrates another example of SS block resources that support reference signal schemes in wireless communications in accordance with aspects of the present disclosure.
Figure 5:
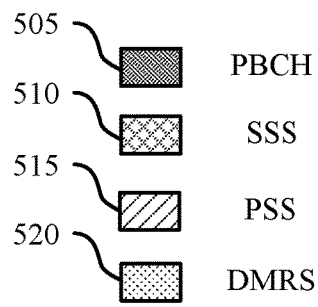

In other examples, such as illustrated in FIG. 5, DMRS tones may be non-unfirmly distributed across two PBCH symbols. FIG. 5 illustrates another example of SS block resources 500 that support reference signal schemes in wireless communications in accordance with various aspects of the present disclosure. In some examples, SS block resources 500 may implement aspects of wireless communications system 100. In this example, SS block resources 500 may include four symbols, two of which may be used to transmit PBCH transmissions 505, one may be used for SSS transmissions 510, and one may be used for PSS transmissions 515. As discussed above, PBCH transmissions 505 may include reference signal transmissions, such as DMRS transmissions 520.

In the example of FIG. 5, the DMRS transmissions may be non-uniformly distributed across symbols that contain PBCH transmissions 505. In this example, overhead associated with reference signal transmissions may be reduced while still providing sufficient information for channel estimation and demodulation at a UE. In other cases, a combination of different densities within PBCH transmissions 505 symbols, and across symbols may be used. In some cases, tone indices for DMRS transmissions 520 may be specified for the PBCH transmission 505 symbols. In some examples, a first set of tone indices may be provided for tones that overlap with SSS transmissions 510, and a second set of tone indices may be provided for tones that are non-overlapping with SSS transmissions 510.

Figure 6:
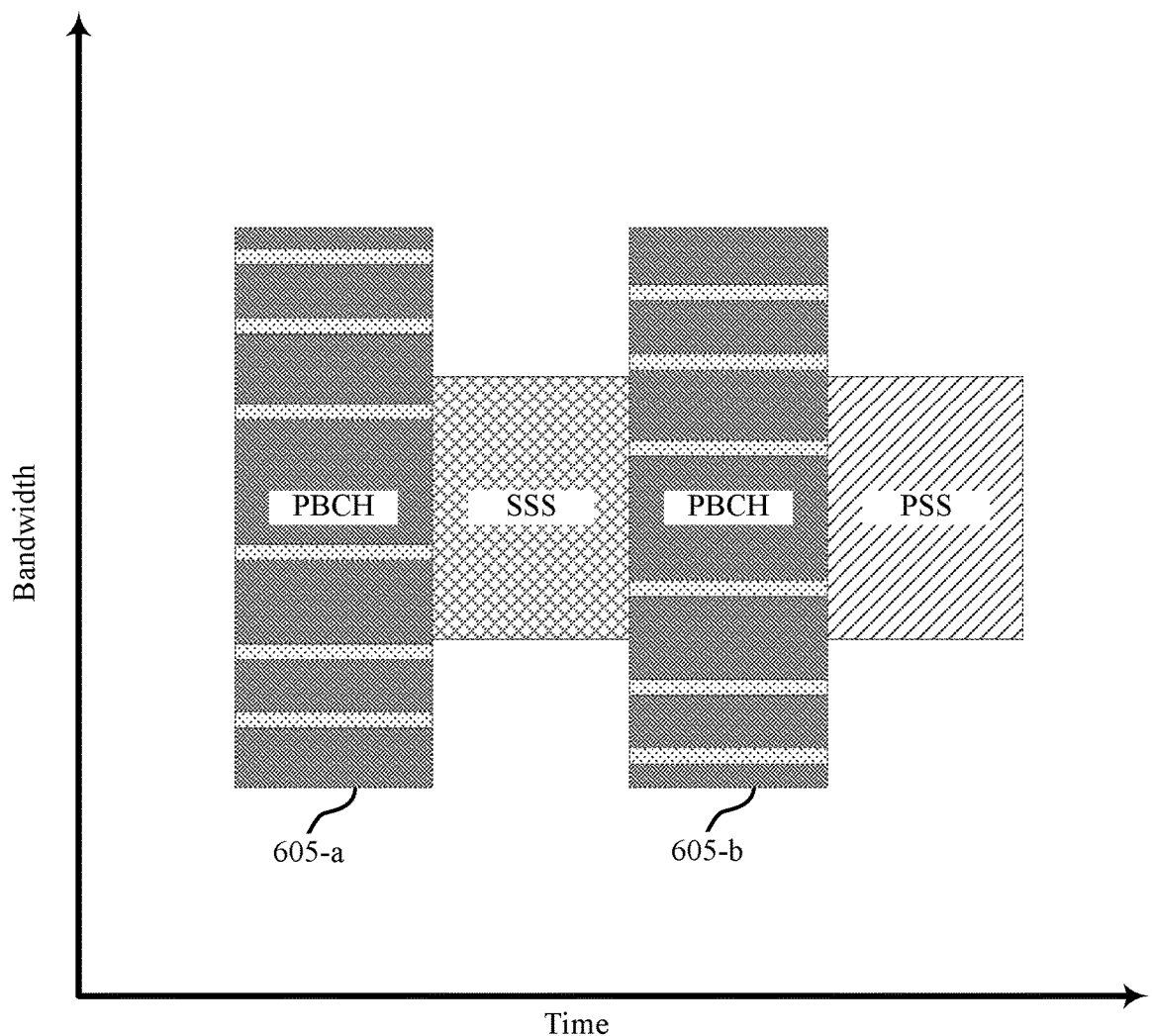
FIG. 6 illustrates another example of SS block resources that support reference signal schemes in wireless communications in accordance with aspects of the present disclosure.
Figure 6:
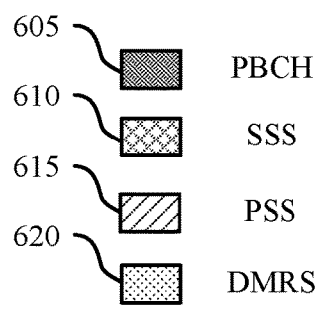

FIG. 6 illustrates another example of SS block resources 600 that support reference signal schemes in wireless communications in accordance with various aspects of the present disclosure. In some examples, SS block resources 600 may implement aspects of wireless communications systems 100 and 200. In this example, SS block resources 600 may include four symbols, two of which may be used to transmit PBCH transmissions 605, one may be used for SSS transmissions 610, and one may be used for PSS transmissions 615. As discussed above, PBCH transmissions 605 may include reference signal transmissions, such as DMRS transmissions 620.

In the example of FIG. 6, the DMRS transmissions 620 may be located in staggered DMRS tones across the symbols with PBCH transmissions 605. In some examples, a hopping pattern may be applied to the DMRS transmission 620 tones of first PBCH transmissions 605-*a* in a first symbol to obtain the tones for DMRS transmissions 620 in a second PBCH transmission 605-*b* in a second symbol. Such staggered tones for DMRS transmissions 620 may provide enhanced channel estimation and frequency diversity relative to examples that use a same set of tones between PBCH transmission 605 symbols. In some cases, none of the DMRS transmission 620 tones may overlap between symbols with PBCH transmissions 605. In other cases, a subset of tones may be common between symbols with PBCH transmissions, such as illustrated in FIG. 7.

Figure 7:
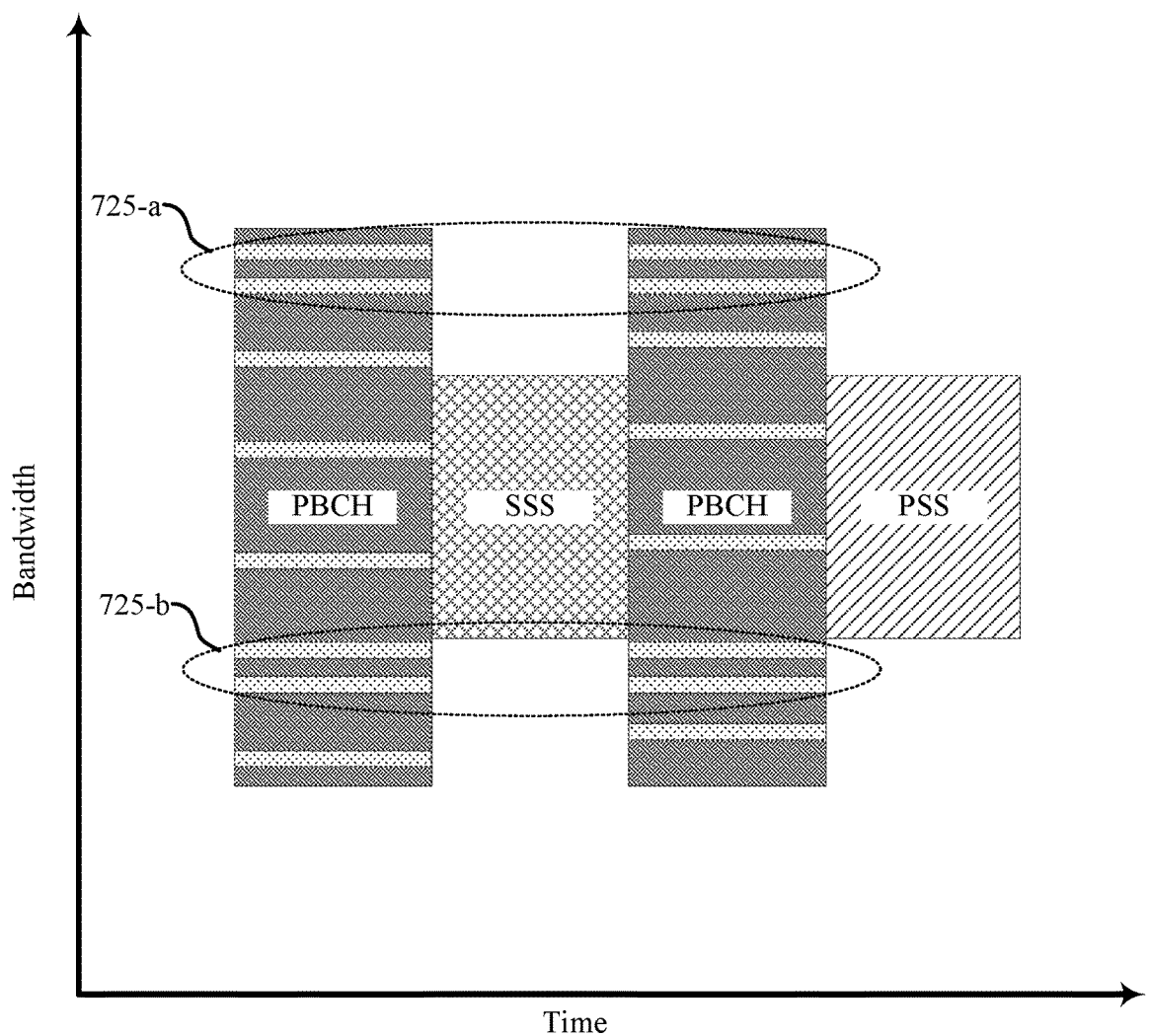
FIG. 7 illustrates another example of SS block resources that support reference signal schemes in wireless communications in accordance with aspects of the present disclosure.
Figure 7:
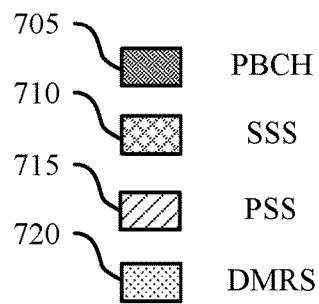

FIG. 7 illustrates another example of SS block resources 700 that support reference signal schemes in wireless communications in accordance with various aspects of the present disclosure. In some examples, SS block resources 700 may implement aspects of wireless communications systems 100 and 200. In this example, SS block resources 700 may include four symbols, two of which may be used to transmit PBCH transmissions 705, one may be used for SSS transmissions 710, and one may be used for PSS transmissions 715. As discussed above, PBCH transmissions 705 may include reference signal transmissions, such as DMRS transmissions 720.

In the example of FIG. 7, the DMRS transmissions 720 may be located in subsets of tones, in which tones of a first subset of tones 725-*a* and a second subset of tones 725-*b* may be common across symbols used for PBCH transmissions 705. DMRS transmissions 720 in tones outside of the subsets of tones 725 may use different tones between symbols. Bu providing common tones across different symbols, enhanced estimation of carrier frequency offset may be provided. While the example of FIG. 7 shows subsets of tones 725 that are common, other examples (e.g., the example of FIG. 4) may provide that the tones in a first PBCH symbol are the same as a set of tones used for DMRS transmissions 720 within a second PBCH symbol.

The waveform that is used for DMRS transmissions as discussed herein may, in some cases, be configured based on one of the PBCH symbols or both of the PBCH symbols of an SS block. In some cases, the two DMRS signals used in the two PBCH symbols within an SS block may be the same sequence. Such a same sequence may be provided, in some examples, when the lengths of the two DMRS sequences (i.e., the number of occupied DMRS tones) are the same.

In other examples, the DMRS sequences for the different PBCH symbols may be partially the same. In such examples, for DMRS transmissions that use the same tones in each symbol, a first DMRS sequence may be used, and a different DMRS sequence may be used for non-common DMRS tones across symbols. For example, a first DMRS sequence 'i' may be mapped to a set of $S_i$ of tones. Further, the set of $S_1$ tones may be divided into two subsets $S_{i1}$ and $S_{i2}$, such that cardinality($S_{11}$)=cardinality($S_{12}$). The two DMRS signals transmitted over the $S_{11}$ and $S_{12}$ tones may be the same, while the DMRS signals may be different on the rest of the tones.

In still further examples, the DMRS sequence for the different PBCH symbols may be completely different. In such cases, the two sequences may be constructed by splitting a long base sequence. For example, the long base sequence may be a Zadoff-Chu sequence or m-sequence, or a cyclic shift thereof.

In some examples, the DMRS sequences, the DMRS locations, or combinations thereof may be used to provide information, such as identification, timing, or configuration information, to a UE. For example, the DMRS sequence(s) for the different PBCH symbols may, singly or jointly, carry information of any combination of a cell ID of the base station, timing information, or information about the synchronization configuration. The timing information may include, for example, SS burst index information within a SS burst set, an SS block index within the SS burst set, a redundancy version (RV) indication of the corresponding PBCH (e.g., a PBCH may have 4 RVs, to carry some level of system timing (e.g. 20 msec boundaries), and the DMRS may include all or part of the RV index of PBCH which may be used by a for PBCH decoding), or any combination thereof. The synchronization configuration information may include, for example, information about the configuration of SS burst, the SS burst set, SS periodicity, or any combination thereof. Such information may be provided through any combination of a choice of DMRS sequences (e.g., different base sequences and the amount of cyclic shifts), or a choice of tone locations allocated to DMRS sequences. In some cases, a mapping may be provided that maps different sequences and/or tone locations to different information.

Figure 8:
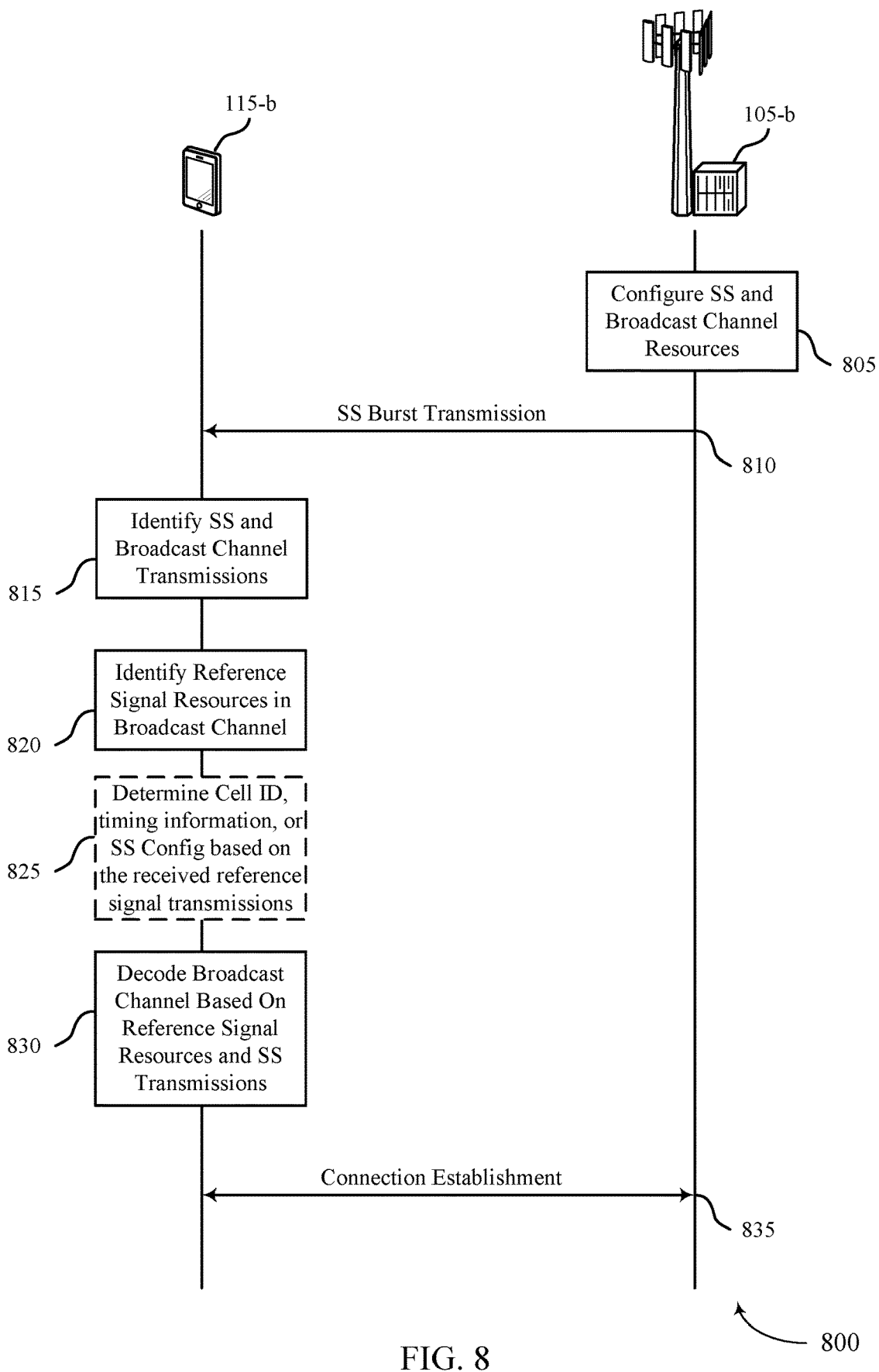
FIG. 8 illustrates an example of a process flow that supports reference signal schemes in wireless communications in accordance with aspects of the present disclosure.

FIG. 8 illustrates an example of a process flow 800 that supports reference signal schemes in wireless communications in accordance with various aspects of the present disclosure. In some examples, process flow 800 may implement aspects of wireless communications system 100. Process flow 800 includes UE 115-b and base station 105-b, each of which may be an example of the corresponding device described with reference to FIGS. 1 and 2.

At 805, base station 105-b may configure SS and broadcast channel resources. As discussed above, in some cases, the base station 105-b may configure a SS block that includes symbols for PBCH transmissions and symbols for SS transmissions. SS burst transmission 810 may be transmitted by the base station 105-b according to the configured resources.

The UE 115-b, at 815, may identify the SS and broadcast channel transmissions. In some case, the UE 115-b may monitor for synchronization transmissions in accordance with a specified synchronization timing. In cases that use mmW frequencies, the SS burst transmission 810 may be transmitted as part of a beam sweeping procedure, and the UE 115-b may receive the SS burst transmission 810 in using one or the transmission beams of the beam sweeping procedure.

At 820, the UE 115-b may identify reference signal resources in the broadcast channel. In some cases, the reference signal resources may be frequency tones that are configured for DMRS transmissions. In some cases, the broadcast channel transmission may be a PBCH transmission which may include two PBCH symbols in broadcast channel time resources.

At optional block 825, the UE 115-b may determine one or more of a cell ID, timing information, or configuration information based on the received reference signal transmission. In some cases, the sequence or waveform of the reference signal may be used to determine such information. In other cases, a location of reference signal resources, such as the tones used for DMRS transmissions, may be used to determine such information. In other cases, a combination of a reference signal sequence and location of reference signal resources may be used to determine such information.

At block 830, the UE 115-b may decode the broadcast channel based on the reference signal resources and the SS transmissions. In some cases, the UE 115-b may decode PBCH transmissions based on DMRS transmissions in DMRS resources, such as discussed above. The UE 115-b and the base station 105-b may then perform a connection establishment 835. For example, the UE 115-b may transmit a random access request, which may initiate a random access procedure to establish a connection between the base station 105-b and the UE 115-b.

Figure 9:
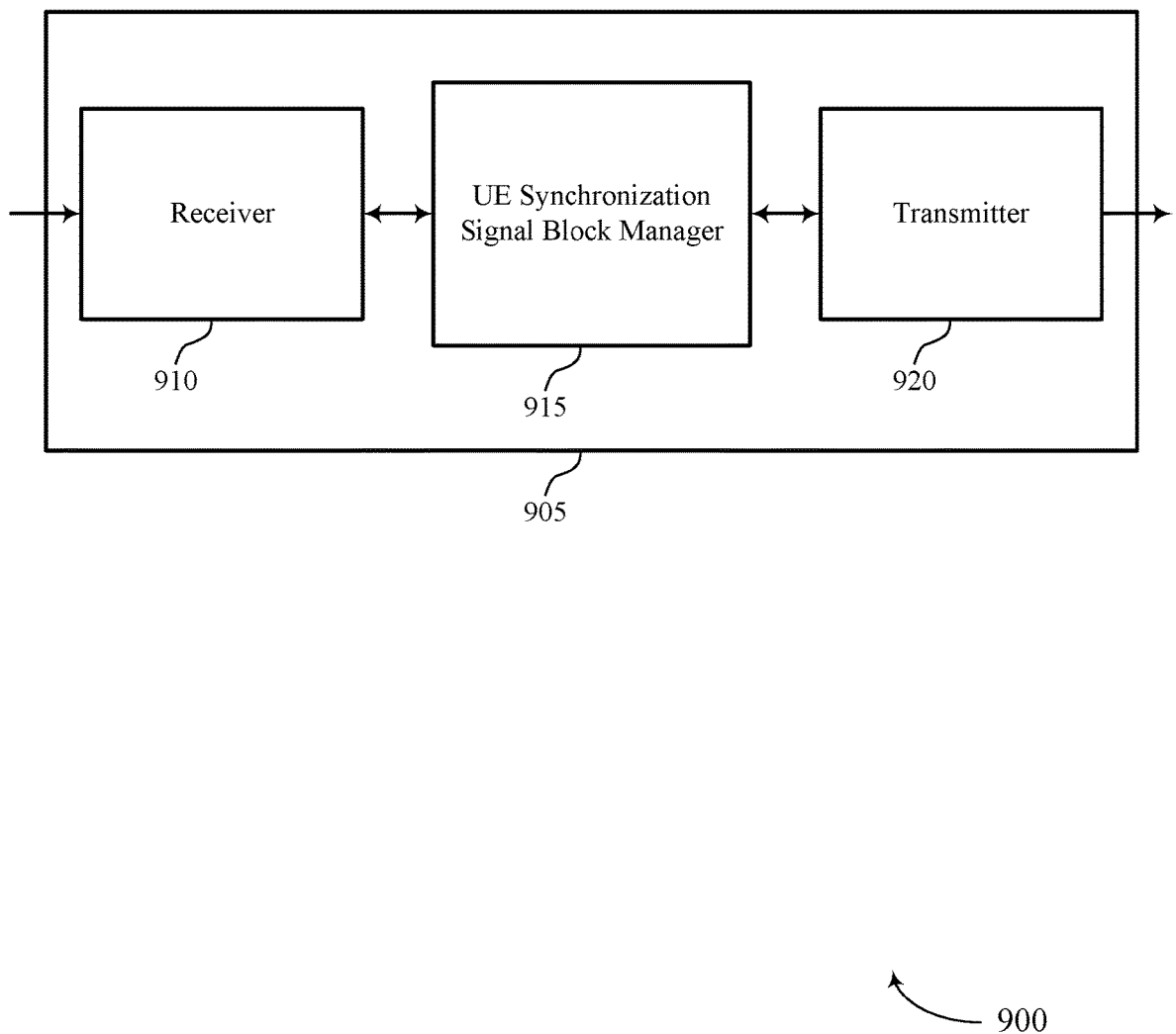
FIGS. 9 through 11 show block diagrams of a device that supports reference signal schemes in wireless communications in accordance with aspects of the present disclosure.

FIG. 9 shows a block diagram 900 of a wireless device 905 that supports reference signal schemes in wireless communications in accordance with aspects of the present disclosure. Wireless device 905 may be an example of aspects of a user equipment (UE) 115 as described herein. Wireless device 905 may include receiver 910, UE synchronization signal block manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to reference signal schemes in wireless communications, etc.). Information may be passed on to other components of the device. The receiver 910 may be an example of aspects of the transceiver 1235 described with reference to FIG. 12. The receiver 910 may utilize a single antenna or a set of antennas.

UE synchronization signal block manager 915 may be an example of aspects of the UE synchronization signal block manager 1215 described with reference to FIG. 12.

UE synchronization signal block manager 915 and/or at least some of its various sub-components may be implemented in hardware, software executed by a processor, firmware, or any combination thereof. If implemented in software executed by a processor, the functions of the UE synchronization signal block manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE synchronization signal block manager 915 and/or at least some of its various sub-components may be physically located at various positions, including being distributed such that portions of functions are implemented at different physical locations by one or more physical devices. In some examples, UE synchronization signal block manager 915 and/or at least some of its various sub-components may be a separate and distinct component in accordance with various aspects of the present disclosure. In other examples, UE synchronization signal block manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE synchronization signal block manager 915 may identify a first set of wireless resources for synchronization signal transmissions and a second set of wireless resources for broadcast channel transmissions, the first set of wireless resources including a first set of frequency resources that span a first bandwidth and the second set of wireless resources including a second set of frequency resources that span a second bandwidth that overlaps at least a portion of the first bandwidth, identify locations of reference signal resources within the second set of wireless resources based on one or more of a time resource location within the second set of wireless resources or a frequency resource location within the second set of wireless resources relative to the first bandwidth, and receive reference signal transmissions using the reference signal resources.

The UE synchronization signal block manager 915 may also identify a first set of wireless resources for synchronization signal transmissions and a second set of wireless resources for broadcast channel transmissions, the second set of wireless resources including a first subset of time resources and a second subset of time resources, identify locations of reference signal resources within the first subset of time resources and the second subset of time resources, receive reference signal transmissions over the reference signal resources, determine a waveform of the reference signal transmissions based on the locations of the reference signal resources, and perform a channel estimation based on the received reference signal transmissions and the determined waveform of the reference signal transmissions.

The UE synchronization signal block manager 915 may also identify a first set of wireless resources for synchronization signal transmissions and a second set of wireless resources for broadcast channel transmissions, identify locations of reference signal resources within the second set of wireless resources, receive reference signal transmissions over the reference signal resources, and determine one or more of a transmitter identification, timing information, or synchronization signal transmission configuration based on the received reference signal transmissions.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
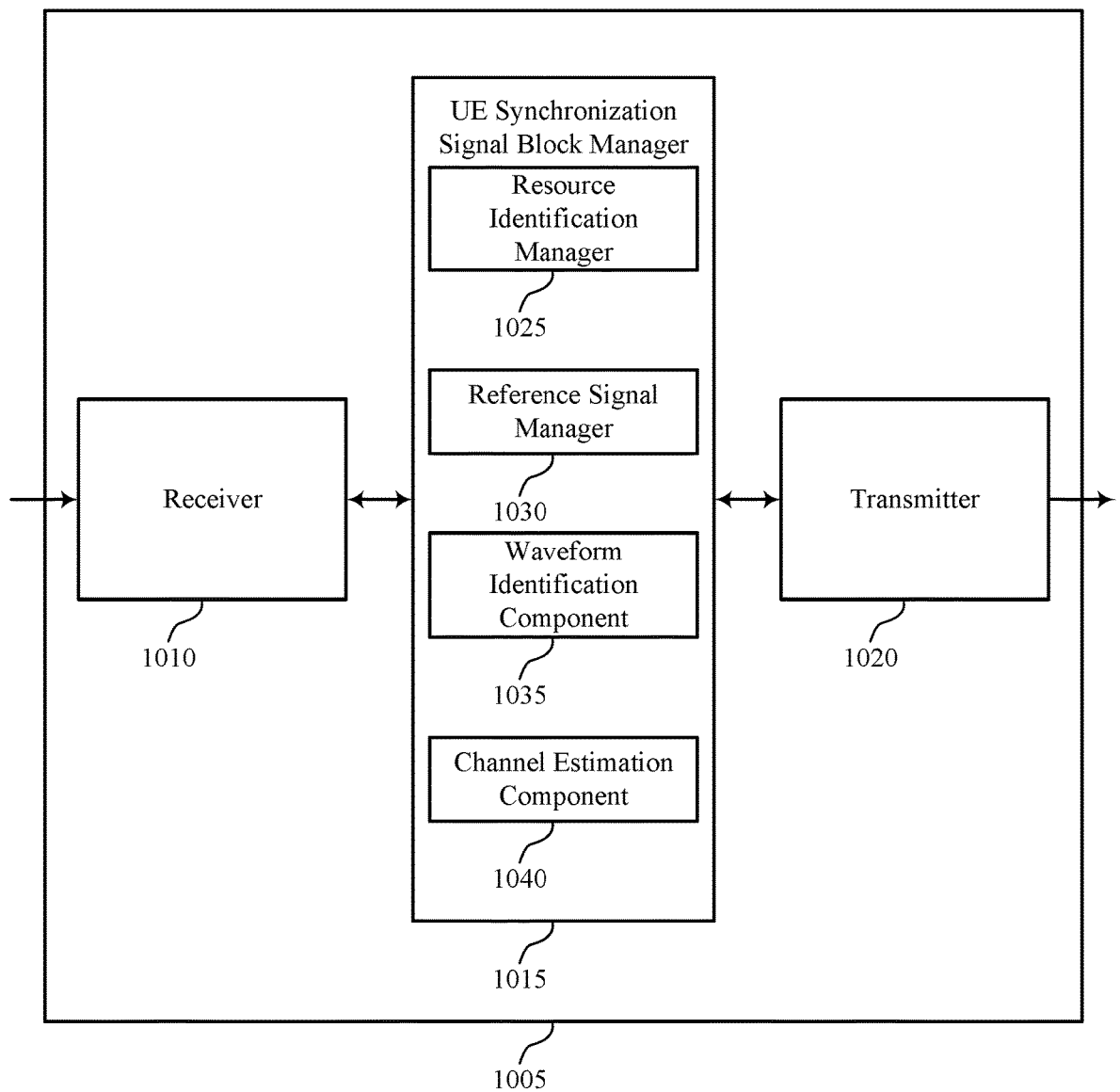

FIG. 10 shows a block diagram 1000 of a wireless device 1005 that supports reference signal schemes in wireless communications in accordance with aspects of the present disclosure. Wireless device 1005 may be an example of aspects of a wireless device 905 or a UE 115 as described with reference to FIG. 9. Wireless device 1005 may include receiver 1010, UE synchronization signal block manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to reference signal schemes in wireless communications, etc.). Information may be passed on to other components of the device. The receiver 1010 may be an example of aspects of the transceiver 1235 described with reference to FIG. 12. The receiver 1010 may utilize a single antenna or a set of antennas.

UE synchronization signal block manager 1015 may be an example of aspects of the UE synchronization signal block manager 1215 described with reference to FIG. 12. UE synchronization signal block manager 1015 may also include resource identification manager 1025, reference signal manager 1030, waveform identification component 1035, and channel estimation component 1040.

Resource identification manager 1025 may identify a first set of wireless resources for synchronization signal transmissions and a second set of wireless resources for broadcast channel transmissions, the first set of wireless resources including a first set of frequency resources that span a first bandwidth and the second set of wireless resources including a second set of frequency resources that span a second bandwidth that overlaps at least a portion of the first bandwidth, identify a first set of wireless resources for synchronization signal transmissions and a second set of wireless resources for broadcast channel transmissions, the second set of wireless resources including a first subset of time resources and a second subset of time resources, and identify a first set of wireless resources for synchronization signal transmissions and a second set of wireless resources for broadcast channel transmissions. In some cases, the second bandwidth is larger than the first bandwidth.

In some cases, the second set of wireless resources include PBCH resources and the first set of wireless resources include synchronization signal resources. In some cases, the PBCH resources include a first symbol of time resources and a third symbol of time resources, the synchronization signal resources include a second symbol of time resources and a fourth symbol of time resources, the second symbol of time resources located between the first symbol of time resources and the third symbol of time resources, and the fourth symbol of time resources located after the third symbol of time resources. In some cases, the second symbol of time resources is for transmission of a secondary synchronization signal and the fourth symbol of time resources is for transmission of a primary synchronization signal.

Reference signal manager 1030 may identify locations of reference signal resources within the second set of wireless resources based on one or more of a time resource location within the second set of wireless resources or a frequency resource location within the second set of wireless resources relative to the first bandwidth, and receive reference signal transmissions over the reference signal resources. In some cases, the second set of wireless resources includes a first subset of time resources and a second subset of time resources, and the reference signal resources are non-uniformly distributed across the first subset of time resources and the second subset of time resources. In some cases, the reference signal resources within the first subset of time resources occupy different frequency resources than at least a portion of reference signal resources within the second subset of time resources. In some cases, the reference signal resources are non-uniformly distributed across frequency resources.

In some cases, the frequency resources include a first subset of frequency resources that are overlapping with a first SS bandwidth and a second subset of frequency resources that are non-overlapping with the first bandwidth, and the second subset of frequency resources has a higher density of reference signal resources than the first subset of frequency resources. In some cases, the first subset of frequency resources is devoid of reference signal resources. In some cases, the reference signal transmissions include DMRS transmissions. In some cases, a UE may determine a cell identification of a base station, a redundancy version of a broadcast channel transmission, a synchronization configuration, or any combination thereof, based on a reference signal sequence of reference signal resources of the reference signal transmissions. In some cases, such a determination is based on a mapping between a reference signal sequence of the reference signal transmissions and one or more of the transmitter identification, the timing information, or the synchronization signal transmission configuration.

Waveform identification component 1035 may determine a waveform of the reference signal transmissions based on the locations of the reference signal resources. In some cases, each of the first subset of time resources and the second subset of time resources have a same reference signal waveform. In some cases, the reference signal waveform is a Zadoff-Chu sequence, an m-sequence, or a cyclic shift thereof.

Channel estimation component 1040 may perform a channel estimation based on the received reference signal transmissions and the determined waveform of the reference signal transmissions. In some cases, at least a portion of the broadcast channel transmissions are demodulated based on synchronization signal transmissions received in the first set of wireless resources.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
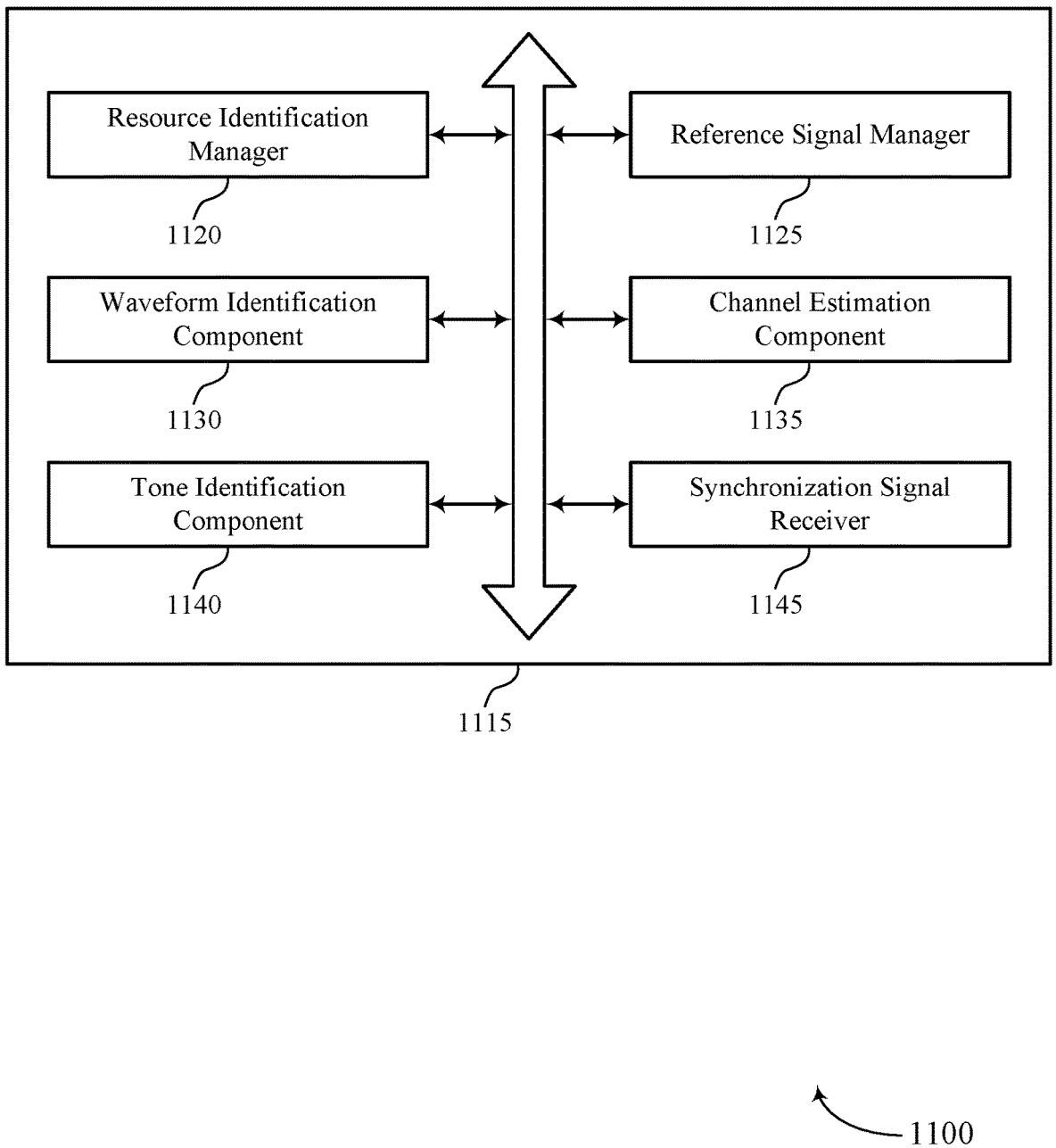

FIG. 11 shows a block diagram 1100 of a UE synchronization signal block manager 1115 that supports reference signal schemes in wireless communications in accordance with aspects of the present disclosure. The UE synchronization signal block manager 1115 may be an example of aspects of a UE synchronization signal block manager 915, a UE synchronization signal block manager 1015, or a UE synchronization signal block manager 1215 described with reference to FIGS. 9, 10, and 12. The UE synchronization signal block manager 1115 may include resource identification manager 1120, reference signal manager 1125, waveform identification component 1130, channel estimation component 1135, tone identification component 1140, and synchronization signal receiver 1145. Each of these modules may communicate, directly or indirectly, with one another (e.g., via one or more buses).

Resource identification manager 1120 may identify a first set of wireless resources for synchronization signal transmissions and a second set of wireless resources for broadcast channel transmissions, the first set of wireless resources including a first set of frequency resources that span a first bandwidth and the second set of wireless resources including a second set of frequency resources that span a second bandwidth that overlaps at least a portion of the first bandwidth, identify a first set of wireless resources for synchronization signal transmissions and a second set of wireless resources for broadcast channel transmissions, the second set of wireless resources including a first subset of time resources and a second subset of time resources, and identify a first set of wireless resources for synchronization signal transmissions and a second set of wireless resources for broadcast channel transmissions. In some cases, the second bandwidth is larger than the first bandwidth.

In some cases, the second set of wireless resources include PBCH resources and the first set of wireless resources include synchronization signal resources. In some cases, the PBCH resources include a first symbol of time resources and a third symbol of time resources, the synchronization signal resources include a second symbol of time resources and a fourth symbol of time resources, the second symbol of time resources located between the first symbol of time resources and the third symbol of time resources, and the fourth symbol of time resources located after the third symbol of time resources. In some cases, the second symbol of time resources is for transmission of a secondary synchronization signal and the fourth symbol of time resources is for transmission of a primary synchronization signal.

Reference signal manager 1125 may identify locations of reference signal resources within the second set of wireless resources based on one or more of a time resource location within the second set of wireless resources or a frequency resource location within the second set of wireless resources relative to the first bandwidth, and receive reference signal transmissions over the reference signal resources. In some cases, the second set of wireless resources includes a first subset of time resources and a second subset of time resources, and the reference signal resources are non-uniformly distributed across the first subset of time resources and the second subset of time resources. In some cases, the reference signal resources within the first subset of time resources occupy different frequency resources than at least a portion of reference signal resources within the second subset of time resources. In some cases, the reference signal resources are non-uniformly distributed across frequency resources.

In some cases, the frequency resources include a first subset of frequency resources that are overlapping with a first SS bandwidth and a second subset of frequency resources that are non-overlapping with the first bandwidth, and the second subset of frequency resources has a higher density of reference signal resources than the first subset of frequency resources. In some cases, the first subset of frequency resources is devoid of reference signal resources. In some cases, the reference signal transmissions include DMRS transmissions. In some cases, a UE may determine a cell identification of a base station, a redundancy version of a broadcast channel transmission, a synchronization configuration, or any combination thereof, based on a reference signal sequence of reference signal resources of the reference signal transmissions. In some cases, such a determination is based on a mapping between a reference signal sequence of the reference signal transmissions and one or more of the transmitter identification, the timing information, or the synchronization signal transmission configuration.

Waveform identification component 1130 may determine a waveform of the reference signal transmissions based on the locations of the reference signal resources. In some cases, each of the first subset of time resources and the second subset of time resources have a same reference signal waveform. In some cases, the reference signal waveform is a Zadoff-Chu sequence, an m-sequence, or a cyclic shift thereof.

Channel estimation component 1135 may perform a channel estimation based on the received reference signal transmissions and the determined waveform of the reference signal transmissions. In some cases, at least a portion of the broadcast channel transmissions are demodulated based on synchronization signal transmissions received in the first set of wireless resources.

Tone identification component 1140 may identify that the second set of wireless resources includes a first subset of time resources and a second subset of time resources, and the reference signal resources within the first subset of time resources occupy different frequency resources than at least a portion of reference signal resources within the second subset of time resources. In some cases, the reference signal resources within the first subset of time resources include a first subset of tones within the first subset of time resources, and a hopping pattern is applied to the first subset of tones to determine a second subset of tones within the second subset of time resources that are the reference signal resources within the second subset of time resources. In some cases, the second set of wireless resources includes a first subset of time resources and a second subset of time resources, and at least a portion of the reference signal resources within the first subset of time resources and the second subset of time resources occupy common frequency tones. In some cases, the locations of the reference signal resources are specified tone indices within the second set of wireless resources. In some cases, the first subset of time resources include reference signal resources in a first subset of tones and a second subset of tones, the second subset of time resources include reference signal resources in the first subset of tones and a third subset of tones. In some cases, the first subset of tones in the first subset of time resources and the second subset of time resources have a same reference signal waveform, and the second subset of tones in the first subset of time resources and the third subset of tones in the second subset of time resources have different reference signal waveforms.

Synchronization signal receiver 1145 may receive synchronization signal transmissions over the first set of wireless resources. In some cases, the determining includes determining information related to a synchronization signal burst index within a synchronization signal burst set based on a reference signal sequence of the reference signal transmissions. In some cases, the determining includes determining information related to a synchronization signal block index within a synchronization signal burst based on a reference signal sequence of the reference signal transmissions. In some cases, the determining includes determining a configuration of one or more of a synchronization signal burst, a synchronization signal burst set, or a periodicity of synchronization signal transmissions based on a reference signal sequence of the reference signal transmissions.

Figure 12:
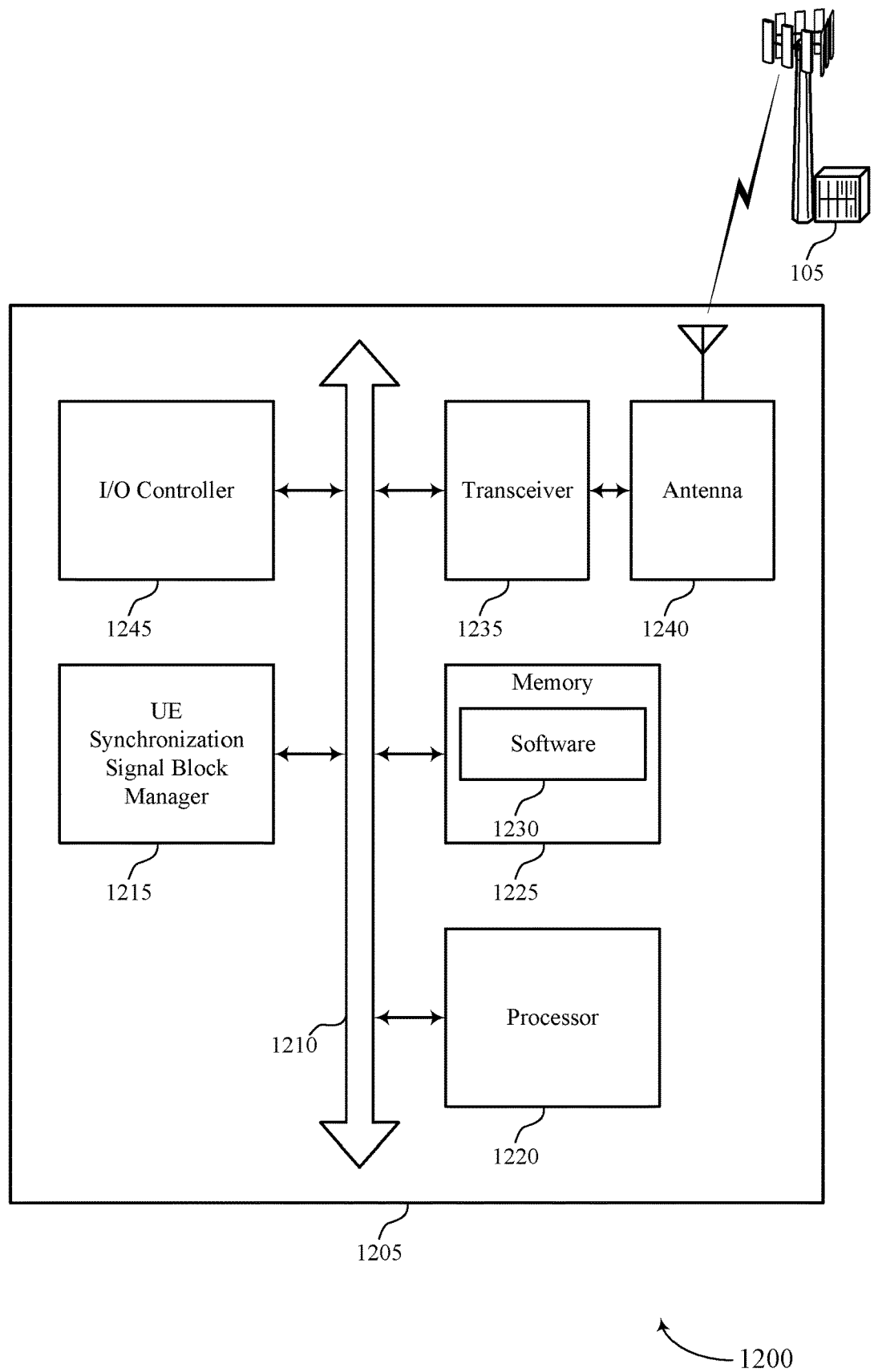
FIG. 12 illustrates a block diagram of a system including a UE that supports reference signal schemes in wireless communications in accordance with aspects of the present disclosure.

FIG. 12 shows a diagram of a system 1200 including a device 1205 that supports reference signal schemes in wireless communications in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE synchronization signal block manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting reference signal schemes in wireless communications).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support reference signal schemes in wireless communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
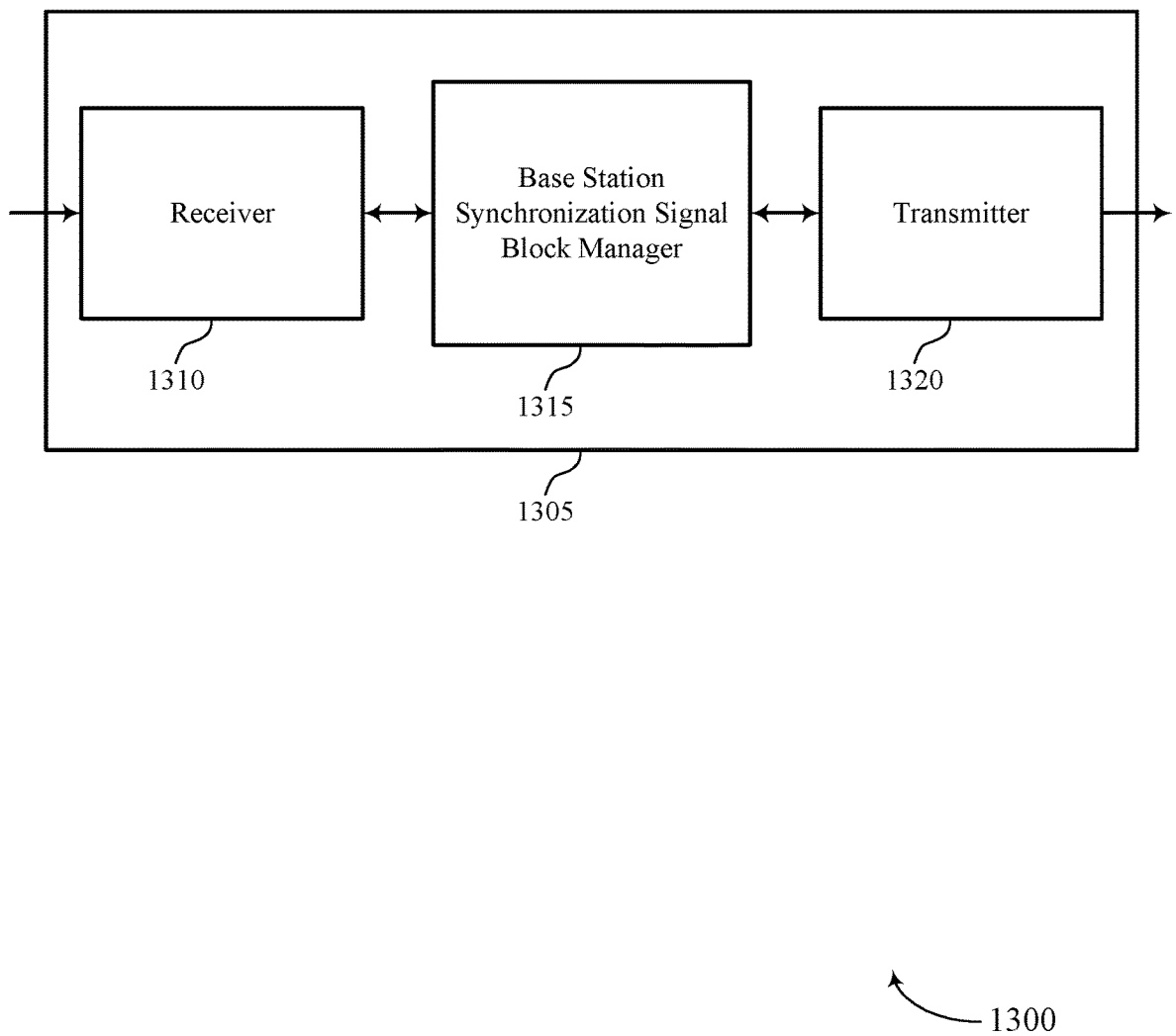
FIGS. 13 through 15 show block diagrams of a device that supports reference signal schemes in wireless communications in accordance with aspects of the present disclosure.

FIG. 13 shows a block diagram 1300 of a wireless device 1305 that supports reference signal schemes in wireless communications in accordance with aspects of the present disclosure. Wireless device 1305 may be an example of aspects of a base station 105 as described herein. Wireless device 1305 may include receiver 1310, base station synchronization signal block manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to reference signal schemes in wireless communications, etc.). Information may be passed on to other components of the device. The receiver 1310 may be an example of aspects of the transceiver 1635 described with reference to FIG. 16. The receiver 1310 may utilize a single antenna or a set of antennas.

Base station synchronization signal block manager 1315 may be an example of aspects of the base station synchronization signal block manager 1615 described with reference to FIG. 16.

Base station synchronization signal block manager 1315 and/or at least some of its various sub-components may be implemented in hardware, software executed by a processor, firmware, or any combination thereof. If implemented in software executed by a processor, the functions of the base station synchronization signal block manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station synchronization signal block manager 1315 and/or at least some of its various sub-components may be physically located at various positions, including being distributed such that portions of functions are implemented at different physical locations by one or more physical devices. In some examples, base station synchronization signal block manager 1315 and/or at least some of its various sub-components may be a separate and distinct component in accordance with various aspects of the present disclosure. In other examples, base station synchronization signal block manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station synchronization signal block manager 1315 may configure a first set of wireless resources for synchronization signal transmissions and a second set of wireless resources for broadcast channel transmissions, the first set of wireless resources including a first set of frequency resources that span a first bandwidth and the second set of wireless resources including a second set of frequency resources that span a second bandwidth that overlaps at least a portion of the first bandwidth, configure reference signal resources within the second set of wireless resources, locations of the reference signal resources based on one or more of a time resource location within the second set of wireless resources or a frequency resource location within the second set of wireless resources relative to the first bandwidth, and transmit reference signal transmissions using the reference signal resources and synchronization signal transmissions using the first set of wireless resources.

The base station synchronization signal block manager 1315 may also configure a first set of wireless resources for synchronization signal transmissions and a second set of wireless resources for broadcast channel transmissions, the second set of wireless resources including a first subset of time resources and a second subset of time resources, configure locations of reference signal resources within the first subset of time resources and the second subset of time resources, determine a waveform of a reference signal transmission based on the locations of the reference signal resources, and transmit the reference signal over the reference signal resources.

The base station synchronization signal block manager 1315 may also configure a first set of wireless resources for synchronization signal transmissions and a second set of wireless resources for broadcast channel transmissions, configure locations of reference signal resources within the second set of wireless resources, and transmit reference signal transmissions over the reference signal resources, where the reference signal transmissions, the locations of the reference signal resources, or any combination thereof provide an indication of one or more of a transmitter identification, timing information, or synchronization signal transmission configuration.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
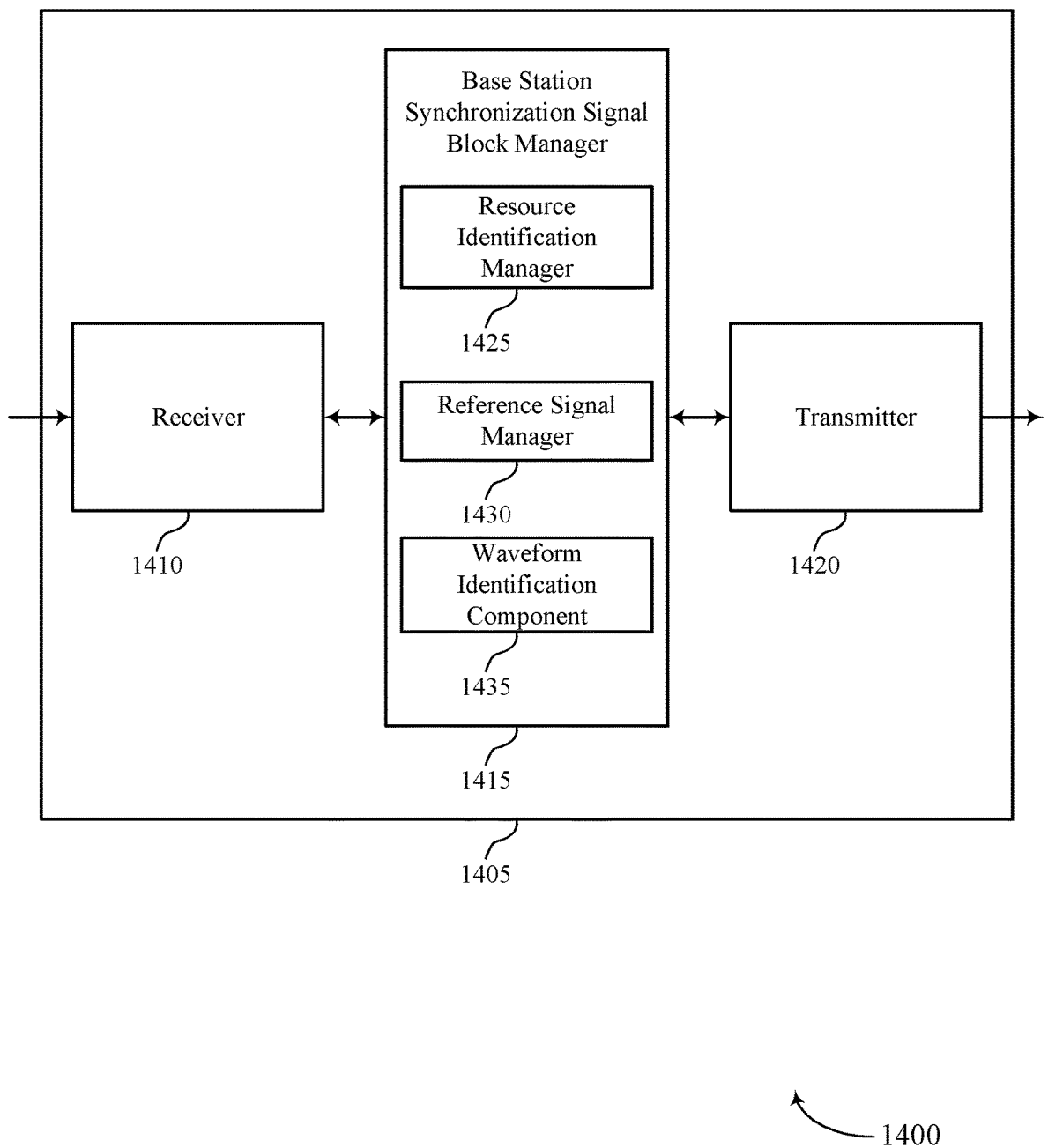

FIG. 14 shows a block diagram 1400 of a wireless device 1405 that supports reference signal schemes in wireless communications in accordance with aspects of the present disclosure. Wireless device 1405 may be an example of aspects of a wireless device 1305 or a base station 105 as described with reference to FIG. 13. Wireless device 1405 may include receiver 1410, base station synchronization signal block manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to reference signal schemes in wireless communications, etc.). Information may be passed on to other components of the device. The receiver 1410 may be an example of aspects of the transceiver 1635 described with reference to FIG. 16. The receiver 1410 may utilize a single antenna or a set of antennas.

Base station synchronization signal block manager 1415 may be an example of aspects of the base station synchronization signal block manager 1615 described with reference to FIG. 16. Base station synchronization signal block manager 1415 may also include resource identification manager 1425, reference signal manager 1430, and waveform identification component 1435.

Resource identification manager 1425 may configure a first set of wireless resources for synchronization signal transmissions and a second set of wireless resources for broadcast channel transmissions, the first set of wireless resources including a first set of frequency resources that span a first bandwidth and the second set of wireless resources including a second set of frequency resources that span a second bandwidth that overlaps at least a portion of the first bandwidth, and may configure a first set of wireless resources for synchronization signal transmissions and a second set of wireless resources for broadcast channel transmissions, the second set of wireless resources including a first subset of time resources and a second subset of time resources. In some cases, the second set of wireless resources include PBCH resources and the first set of wireless resources include synchronization signal resources. In some cases, the PBCH resources include a first symbol of time resources and a third symbol of time resources, the synchronization signal resources include a second symbol of time resources and a fourth symbol of time resources, the second symbol of time resources located between the first symbol of time resources and the third symbol of time resources, and the fourth symbol of time resources located after the third symbol of time resources. In some cases, the second symbol of time resources is for transmission of a secondary synchronization signal and the fourth symbol of time resources is for transmission of a primary synchronization signal. In some cases, the second set of wireless resources include PBCH resources and the first set of wireless resources include synchronization signal resources. In some cases, the second bandwidth is larger than the first bandwidth. In some cases, the base station may configure non-uniformly distributed the reference signal resources across the second set of frequency resources.

Reference signal manager 1430 may configure reference signal resources within the second set of wireless resources, locations of the reference signal resources based on one or more of a time resource location within the second set of wireless resources or a frequency resource location within the second set of wireless resources relative to the first bandwidth. In some cases, the reference signal transmissions include DMRS transmissions. In some cases, the configuring locations of the reference signal resources includes configuring non-uniformly distributed reference signal resources across the second set of frequency resources. In some cases, the second set of frequency resources include a first subset of frequency resources that are overlapping with the first bandwidth and a second subset of frequency resources that are non-overlapping with the first bandwidth, and the second subset of frequency resources has a higher density of reference signal resources than the first subset of frequency resources. In some cases, the first subset of frequency resources is devoid of reference signal resources. In some cases, the second set of wireless resources includes a first subset of time resources and a second subset of time resources, and the reference signal resources are non-uniformly distributed across the first subset of time resources and the second subset of time resources.

In some cases, one or more of a cell identification of a base station, synchronization signal burst index within a synchronization signal burst set, a synchronization signal block index within a synchronization signal burst, a redundancy version of a broadcast channel transmission transmitted in the second set of wireless resources, a configuration of a synchronization signal burst, a synchronization signal burst set, a periodicity of synchronization signal transmissions, or any combination thereof is mapped to a reference signal sequence of the reference signal transmissions. In some cases, the mapping is between tone locations of the reference signal resources and one or more of the cell identification of the base station, the synchronization signal burst index within the synchronization signal burst set, the synchronization signal block index within the synchronization signal burst, the redundancy version of the broadcast channel transmission transmitted in the second set of wireless resources, the configuration of the synchronization signal burst, the synchronization signal burst set, the periodicity of synchronization signal transmissions, or any combination thereof.

Waveform identification component 1435 may determine a waveform of a reference signal transmission based on the locations of the reference signal resources. In some cases, each of the first subset of time resources and the second subset of time resources have a same reference signal waveform. In some cases, the reference signal waveform is a Zadoff-Chu sequence, an m-sequence, or a cyclic shift thereof. In some cases, the first subset of tones in the first subset of time resources and the second subset of time resources have a same reference signal waveform, and the second subset of tones in the first subset of time resources and the third subset of tones in the second subset of time resources have different reference signal waveforms. In some cases, the first subset of time resources and the second subset of time resources have different reference signal waveforms. In some cases, the first subset of time resources and the second subset of time resources have different portions of a reference signal sequence, such as a Zadoff-Chu sequence, an m-sequence, or a cyclic shift thereof.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
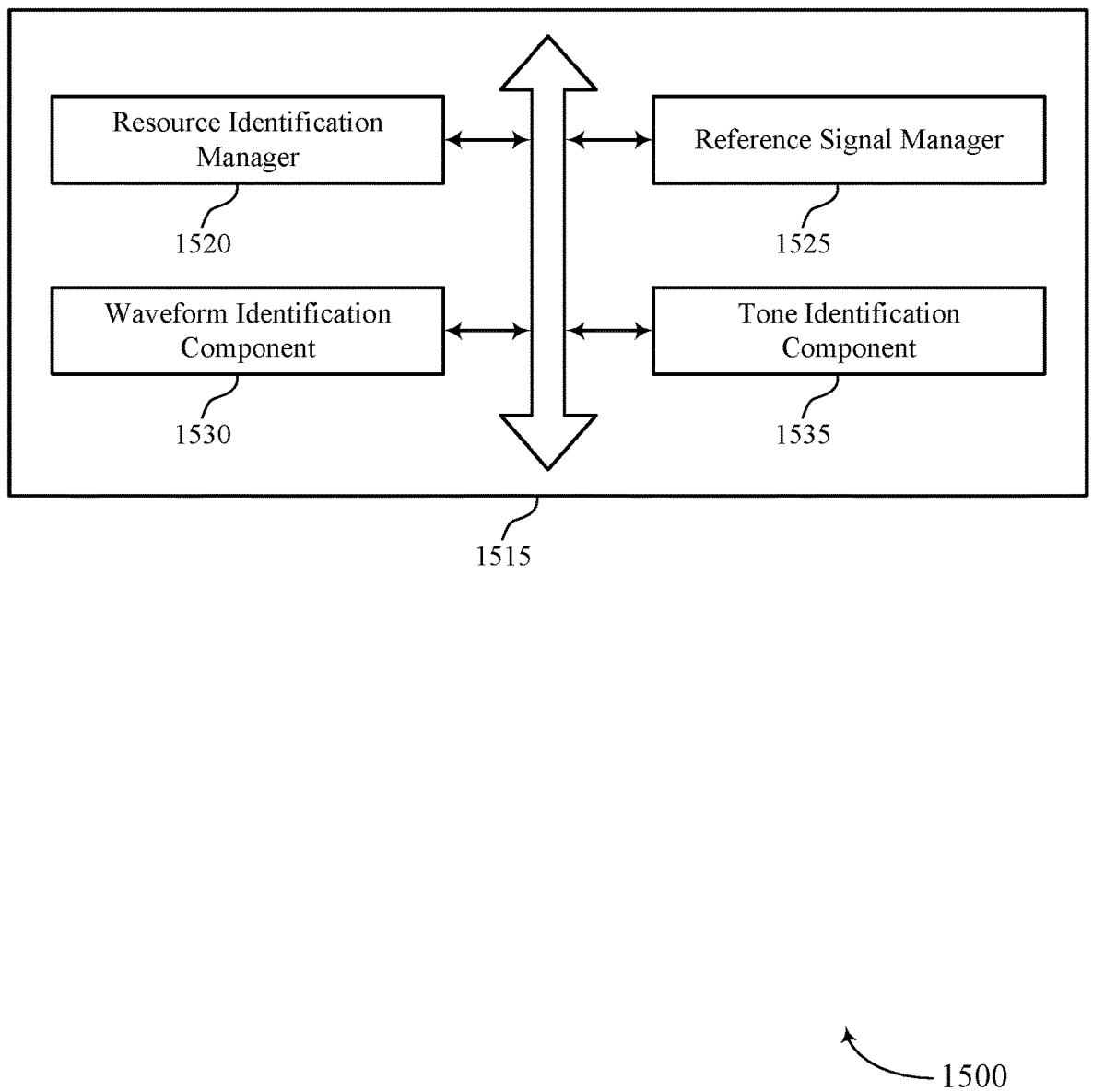

FIG. 15 shows a block diagram 1500 of a base station synchronization signal block manager 1515 that supports reference signal schemes in wireless communications in accordance with aspects of the present disclosure. The base station synchronization signal block manager 1515 may be an example of aspects of a base station synchronization signal block manager 1615 described with reference to FIGS. 13, 14, and 16. The base station synchronization signal block manager 1515 may include resource identification manager 1520, reference signal manager 1525, waveform identification component 1530, and tone identification component 1535. Each of these modules may communicate, directly or indirectly, with one another (e.g., via one or more buses).

Resource identification manager 1520 may configure a first set of wireless resources for synchronization signal transmissions and a second set of wireless resources for broadcast channel transmissions, the first set of wireless resources including a first set of frequency resources that span a first bandwidth and the second set of wireless resources including a second set of frequency resources that span a second bandwidth that overlaps at least a portion of the first bandwidth, and may configure a first set of wireless resources for synchronization signal transmissions and a second set of wireless resources for broadcast channel transmissions, the second set of wireless resources including a first subset of time resources and a second subset of time resources. In some cases, the second set of wireless resources include PBCH resources and the first set of wireless resources include synchronization signal resources. In some cases, the PBCH resources include a first symbol of time resources and a third symbol of time resources, the synchronization signal resources include a second symbol of time resources and a fourth symbol of time resources, the second symbol of time resources located between the first symbol of time resources and the third symbol of time resources, and the fourth symbol of time resources located after the third symbol of time resources. In some cases, the second symbol of time resources is for transmission of a secondary synchronization signal and the fourth symbol of time resources is for transmission of a primary synchronization signal. In some cases, the second set of wireless resources include PBCH resources and the first set of wireless resources include synchronization signal resources. In some cases, the second bandwidth is larger than the first bandwidth. In some cases, the base station may configure non-uniformly distributed the reference signal resources across the second set of frequency resources.

Reference signal manager 1525 may configure reference signal resources within the second set of wireless resources, locations of the reference signal resources based on one or more of a time resource location within the second set of wireless resources or a frequency resource location within the second set of wireless resources relative to the first bandwidth. In some cases, the reference signal transmissions include DMRS transmissions. In some cases, the configuring locations of the reference signal resources includes configuring non-uniformly distributed reference signal resources across the second set of frequency resources. In some cases, the second set of frequency resources include a first subset of frequency resources that are overlapping with the first bandwidth and a second subset of frequency resources that are non-overlapping with the first bandwidth, and the second subset of frequency resources has a higher density of reference signal resources than the first subset of frequency resources. In some cases, the first subset of frequency resources is devoid of reference signal resources. In some cases, the second set of wireless resources includes a first subset of time resources and a second subset of time resources, and the reference signal resources are non-uniformly distributed across the first subset of time resources and the second subset of time resources.

In some cases, one or more of a cell identification of a base station, synchronization signal burst index within a synchronization signal burst set, a synchronization signal block index within a synchronization signal burst, a redundancy version of a broadcast channel transmission transmitted in the second set of wireless resources, a configuration of a synchronization signal burst, a synchronization signal burst set, a periodicity of synchronization signal transmissions, or any combination thereof is mapped to a reference signal sequence of the reference signal transmissions. In some cases, the mapping is between tone locations of the reference signal resources and one or more of the cell identification of the base station, the synchronization signal burst index within the synchronization signal burst set, the synchronization signal block index within the synchronization signal burst, the redundancy version of the broadcast channel transmission transmitted in the second set of wireless resources, the configuration of the synchronization signal burst, the synchronization signal burst set, the periodicity of synchronization signal transmissions, or any combination thereof.

Waveform identification component may determine a waveform of a reference signal transmission based on the locations of the reference signal resources. In some cases, each of the first subset of time resources and the second subset of time resources have a same reference signal waveform. In some cases, the reference signal waveform is a Zadoff-Chu sequence, an m-sequence, or a cyclic shift thereof. In some cases, the first subset of tones in the first subset of time resources and the second subset of time resources have a same reference signal waveform, and the second subset of tones in the first subset of time resources and the third subset of tones in the second subset of time resources have different reference signal waveforms. In some cases, the first subset of time resources and the second subset of time resources have different reference signal waveforms. In some cases, the first subset of time resources and the second subset of time resources have different portions of a reference signal sequence, such as a Zadoff-Chu sequence, an m-sequence, or a cyclic shift thereof.

Tone identification component 1535 may, in some cases, identify tones for reference signal resources. In some cases, the reference signal resources within the first subset of time resources include a first subset of tones within the first subset of time resources, and a hopping pattern is applied to the first subset of tones to determine a second subset of tones within the second subset of time resources that are the reference signal resources within the second subset of time resources. In some cases, the second set of wireless resources includes a first subset of time resources and a second subset of time resources, and at least a portion of the reference signal resources within the first subset of time resources and the second subset of time resources occupy common frequency tones. In some cases, the locations of the reference signal resources are specified tone indices within the second set of wireless resources.

Figure 16:
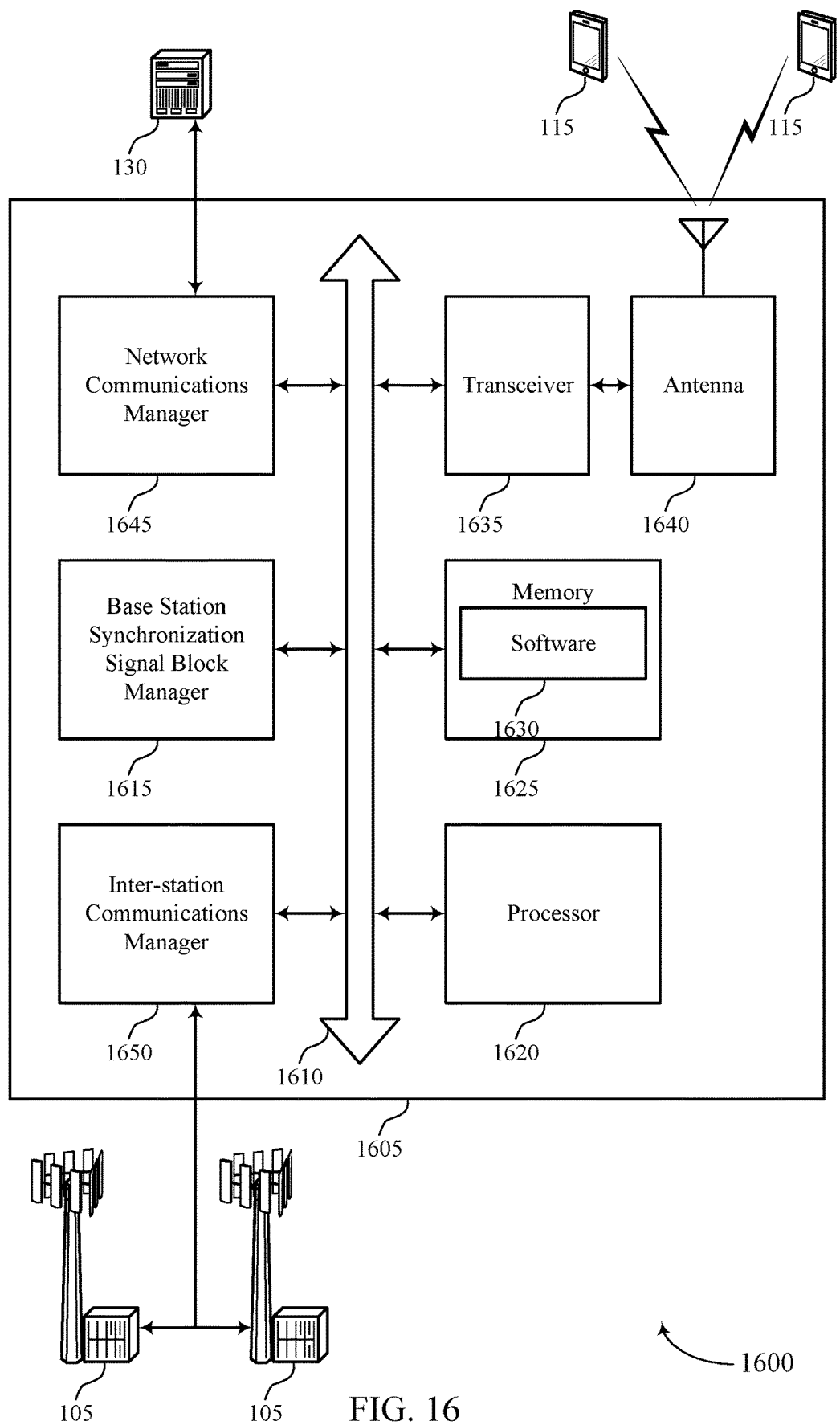
FIG. 16 illustrates a block diagram of a system including a base station that supports reference signal schemes in wireless communications in accordance with aspects of the present disclosure.

FIG. 16 shows a diagram of a system 1600 including a device 1605 that supports reference signal schemes in wireless communications in accordance with aspects of the present disclosure. Device 1605 may be an example of or include the components of base station 105 as described above, e.g., with reference to FIG. 1. Device 1605 may include components for bi-directional voice and data communications including components for transmitting and receiving communications, including base station synchronization signal block manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting reference signal schemes in wireless communications).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware and/or software operation such as the interaction with peripheral components or devices.

Software 1630 may include code to implement aspects of the present disclosure, including code to support reference signal schemes in wireless communications. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an Long Term Evolution (LTE)/LTE-A wireless communication network technology to provide communication between base stations 105.

Figure 17:
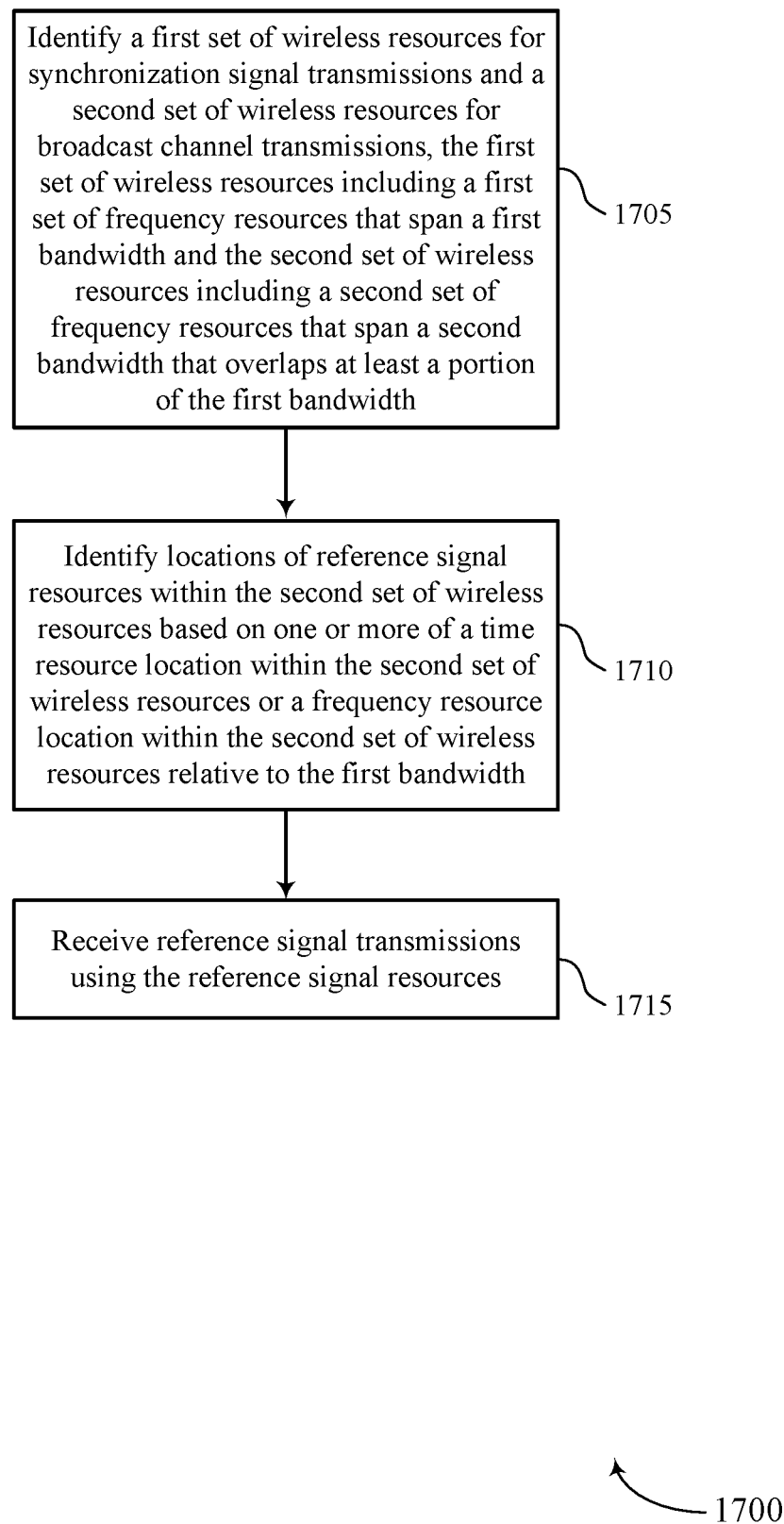
FIGS. 17 through 22 illustrate methods for reference signal schemes in wireless communications in accordance with aspects of the present disclosure.

FIG. 17 shows a flowchart illustrating a method 1700 for reference signal schemes in wireless communications in accordance with aspects of the present disclosure. The operations of method 1700 may be implemented by a UE 115 or its components as described herein. For example, the operations of method 1700 may be performed by a UE synchronization signal block manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may identify a first set of wireless resources for synchronization signal transmissions and a second set of wireless resources for broadcast channel transmissions, the first set of wireless resources comprising a first set of frequency resources that span a first bandwidth and the second set of wireless resources comprising a second set of frequency resources that span a second bandwidth that overlaps at least a portion of the first bandwidth. The operations of block 1705 may be performed according to the methods described herein. In certain examples, aspects of the operations of block 1705 may be performed by a resource identification manager as described with reference to FIGS. 9 through 12.

At block 1710 the UE 115 may identify locations of reference signal resources within the second set of wireless resources based at least in part on one or more of a time resource location within the second set of wireless resources or a frequency resource location within the second set of wireless resources relative to the first bandwidth. The operations of block 1710 may be performed according to the methods described herein. In certain examples, aspects of the operations of block 1710 may be performed by a reference signal manager as described with reference to FIGS. 9 through 12.

At block 1715 the UE 115 may receive reference signal transmissions using the reference signal resources. The operations of block 1715 may be performed according to the methods described herein. In certain examples, aspects of the operations of block 1715 may be performed by a reference signal manager as described with reference to FIGS. 9 through 12.

Figure 18:
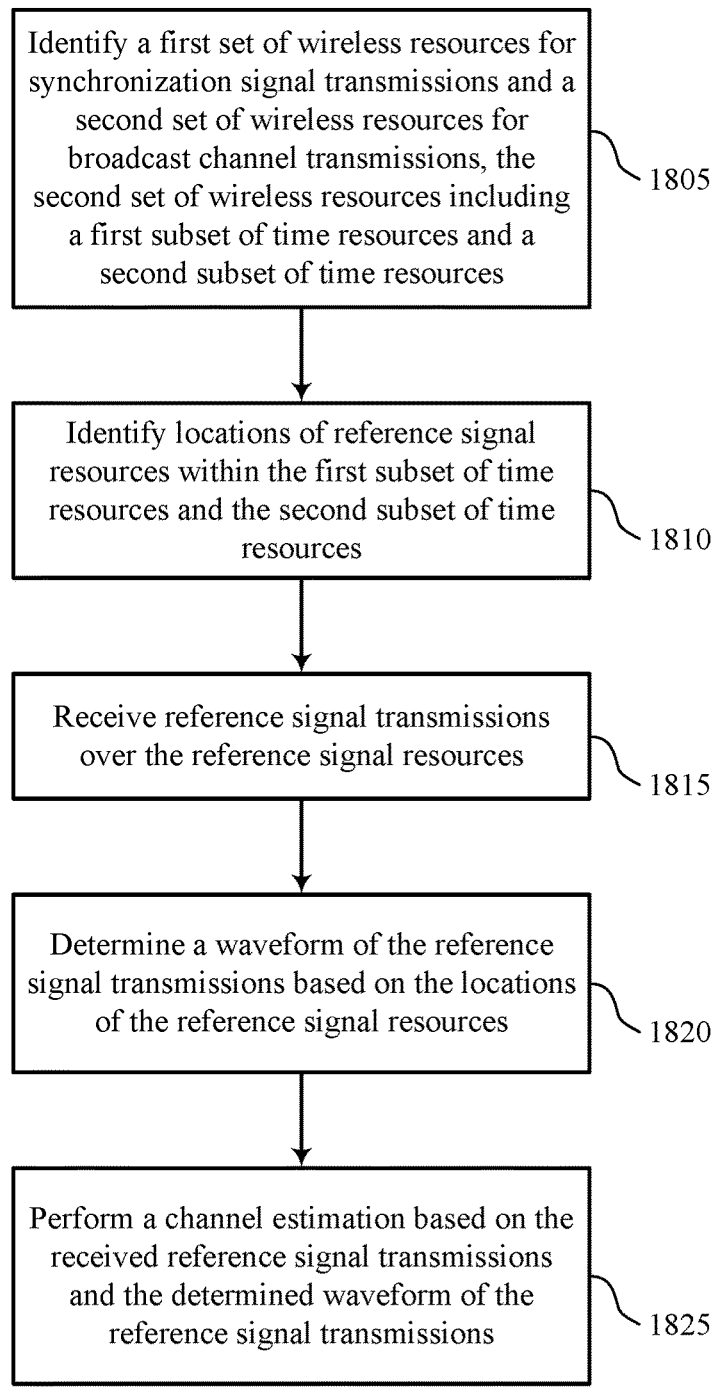

FIG. 18 shows a flowchart illustrating a method 1800 for reference signal schemes in wireless communications in accordance with aspects of the present disclosure. The operations of method 1800 may be implemented by a UE 115 or its components as described herein. For example, the operations of method 1800 may be performed by a UE synchronization signal block manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may identify a first set of wireless resources for synchronization signal transmissions and a second set of wireless resources for broadcast channel transmissions, the second set of wireless resources comprising a first subset of time resources and a second subset of time resources. The operations of block 1805 may be performed according to the methods described herein. In certain examples, aspects of the operations of block 1805 may be performed by a resource identification manager as described with reference to FIGS. 9 through 12.

At block 1810 the UE 115 may identify locations of reference signal resources within the first subset of time resources and the second subset of time resources. The operations of block 1810 may be performed according to the methods described herein. In certain examples, aspects of the operations of block 1810 may be performed by a reference signal manager as described with reference to FIGS. 9 through 12.

At block 1815 the UE 115 may receive reference signal transmissions over the reference signal resources. The operations of block 1815 may be performed according to the methods described herein. In certain examples, aspects of the operations of block 1815 may be performed by a reference signal manager as described with reference to FIGS. 9 through 12.

At block 1820 the UE 115 may determine a waveform of the reference signal transmissions based at least in part on the locations of the reference signal resources. The operations of block 1820 may be performed according to the methods described herein. In certain examples, aspects of the operations of block 1820 may be performed by a waveform identification component as described with reference to FIGS. 9 through 12.

At block 1825 the UE 115 may perform a channel estimation based at least in part on the received reference signal transmissions and the determined waveform of the reference signal transmissions. The operations of block 1825 may be performed according to the methods described herein. In certain examples, aspects of the operations of block 1825 may be performed by a channel estimation component as described with reference to FIGS. 9 through 12.

Figure 19:
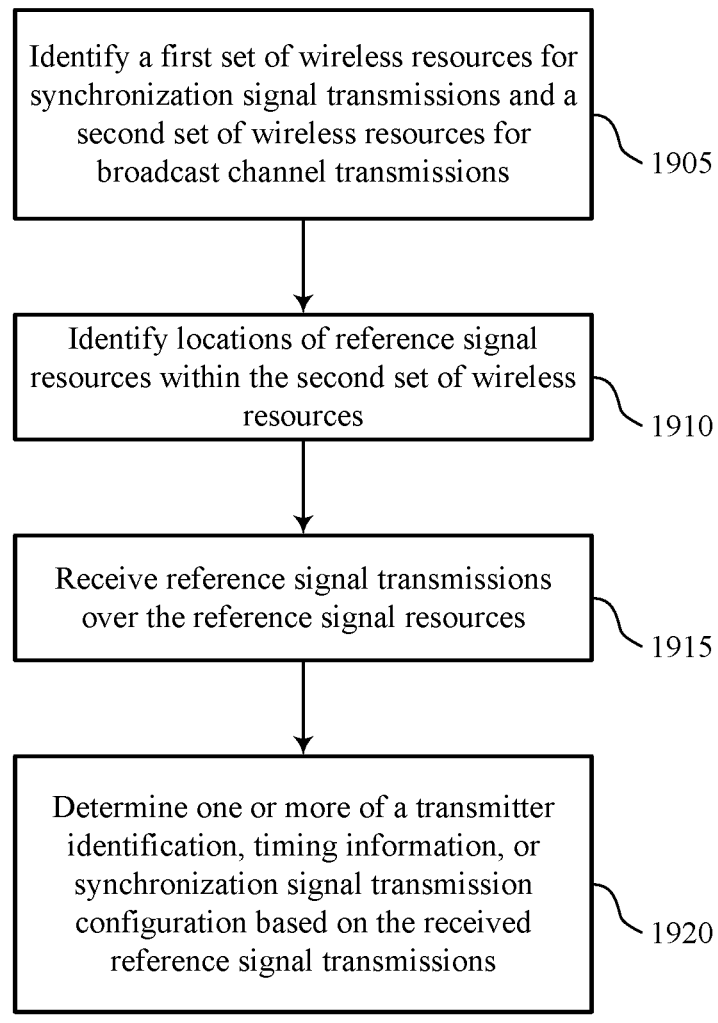

FIG. 19 shows a flowchart illustrating a method 1900 for reference signal schemes in wireless communications in accordance with aspects of the present disclosure. The operations of method 1900 may be implemented by a UE 115 or its components as described herein. For example, the operations of method 1900 may be performed by a UE synchronization signal block manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may identify a first set of wireless resources for synchronization signal transmissions and a second set of wireless resources for broadcast channel transmissions. The operations of block 1905 may be performed according to the methods described herein. In certain examples, aspects of the operations of block 1905 may be performed by a resource identification manager as described with reference to FIGS. 9 through 12.

At block 1910 the UE 115 may identify locations of reference signal resources within the second set of wireless resources. The operations of block 1910 may be performed according to the methods described herein. In certain examples, aspects of the operations of block 1910 may be performed by a reference signal manager as described with reference to FIGS. 9 through 12.

At block 1915 the UE 115 may receive reference signal transmissions over the reference signal resources. The operations of block 1915 may be performed according to the methods described herein. In certain examples, aspects of the operations of block 1915 may be performed by a reference signal manager as described with reference to FIGS. 9 through 12.

At block 1920 the UE 115 may determine one or more of a transmitter identification, timing information, or synchronization signal transmission configuration based at least in part on the received reference signal transmissions. The operations of block 1920 may be performed according to the methods described herein. In certain examples, aspects of the operations of block 1920 may be performed by a reference signal manager as described with reference to FIGS. 9 through 12.

Figure 20:
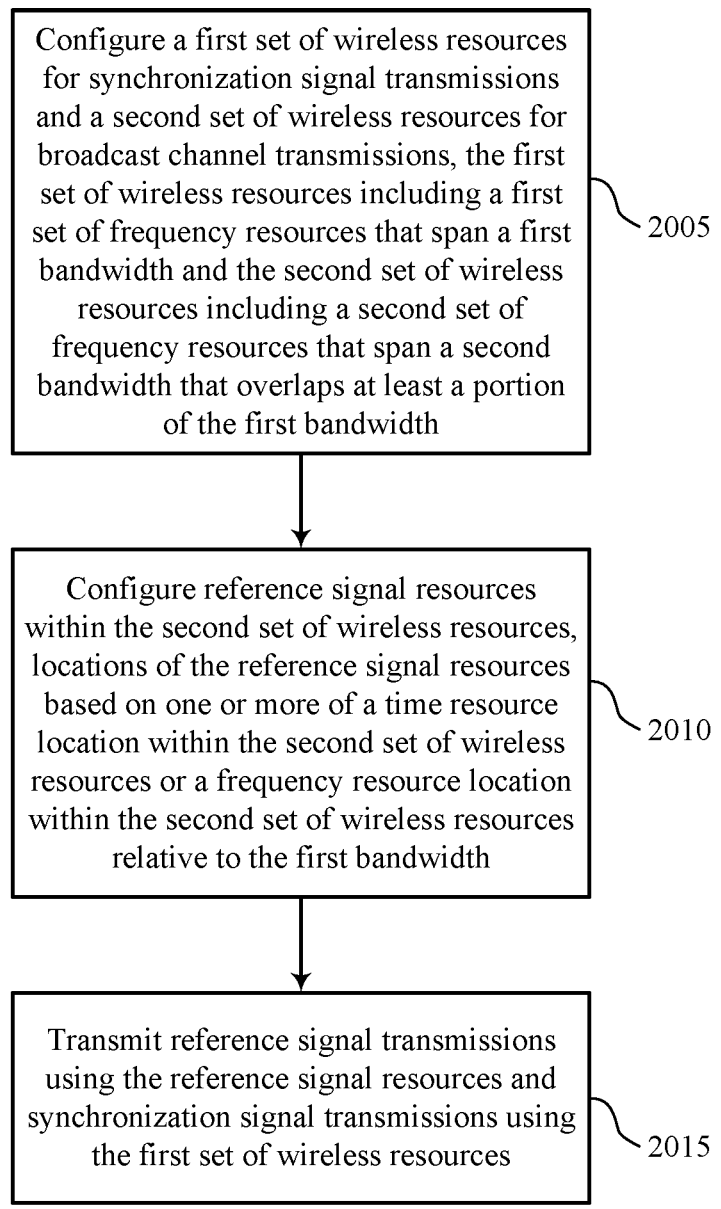

FIG. 20 shows a flowchart illustrating a method 2000 for reference signal schemes in wireless communications in accordance with aspects of the present disclosure. The operations of method 2000 may be implemented by a base station 105 or its components as described herein. For example, the operations of method 2000 may be performed by a base station synchronization signal block manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may configure a first set of wireless resources for synchronization signal transmissions and a second set of wireless resources for broadcast channel transmissions, the first set of wireless resources comprising a first set of frequency resources that span a first bandwidth and the second set of wireless resources comprising a second set of frequency resources that span a second bandwidth that overlaps at least a portion of the first bandwidth. The operations of block 2005 may be performed according to the methods described herein. In certain examples, aspects of the operations of block 2005 may be performed by a resource identification manager as described with reference to FIGS. 13 through 16.

At block 2010 the base station 105 may configure reference signal resources within the second set of wireless resources, locations of the reference signal resources based at least in part on one or more of a time resource location within the second set of wireless resources or a frequency resource location within the second set of wireless resources relative to the first bandwidth. The operations of block 2010 may be performed according to the methods described herein. In certain examples, aspects of the operations of block 2010 may be performed by a reference signal manager as described with reference to FIGS. 13 through 16.

At block 2015 the base station 105 may transmit reference signal transmissions using the reference signal resources and synchronization signal transmissions using the first set of wireless resources. The operations of block 2015 may be performed according to the methods described herein. In certain examples, aspects of the operations of block 2015 may be performed by a reference signal manager as described with reference to FIGS. 13 through 16.

Figure 21:
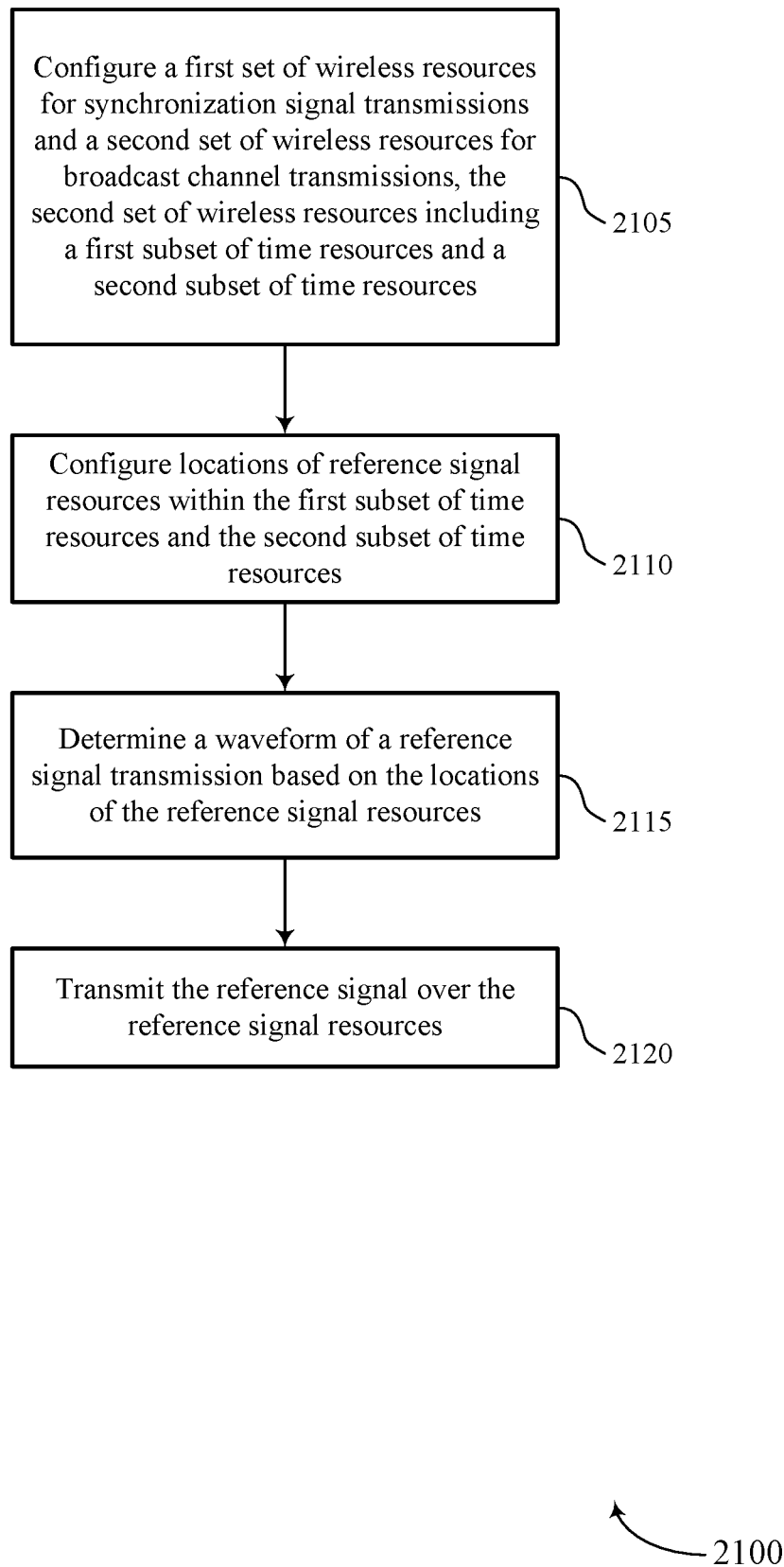

FIG. 21 shows a flowchart illustrating a method 2100 for reference signal schemes in wireless communications in accordance with aspects of the present disclosure. The operations of method 2100 may be implemented by a base station 105 or its components as described herein. For example, the operations of method 2100 may be performed by a base station synchronization signal block manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may configure a first set of wireless resources for synchronization signal transmissions and a second set of wireless resources for broadcast channel transmissions, the second set of wireless resources comprising a first subset of time resources and a second subset of time resources. The operations of block 2105 may be performed according to the methods described herein. In certain examples, aspects of the operations of block 2105 may be performed by a resource identification manager as described with reference to FIGS. 13 through 16.

At block 2110 the base station 105 may configure locations of reference signal resources within the first subset of time resources and the second subset of time resources. The operations of block 2110 may be performed according to the methods described herein. In certain examples, aspects of the operations of block 2110 may be performed by a reference signal manager as described with reference to FIGS. 13 through 16.

At block 2115 the base station 105 may determine a waveform of a reference signal transmission based at least in part on the locations of the reference signal resources. The operations of block 2115 may be performed according to the methods described herein. In certain examples, aspects of the operations of block 2115 may be performed by a waveform identification component as described with reference to FIGS. 13 through 16.

At block 2120 the base station 105 may transmit the reference signal over the reference signal resources. The operations of block 2120 may be performed according to the methods described herein. In certain examples, aspects of the operations of block 2120 may be performed by a reference signal manager as described with reference to FIGS. 13 through 16.

Figure 22:
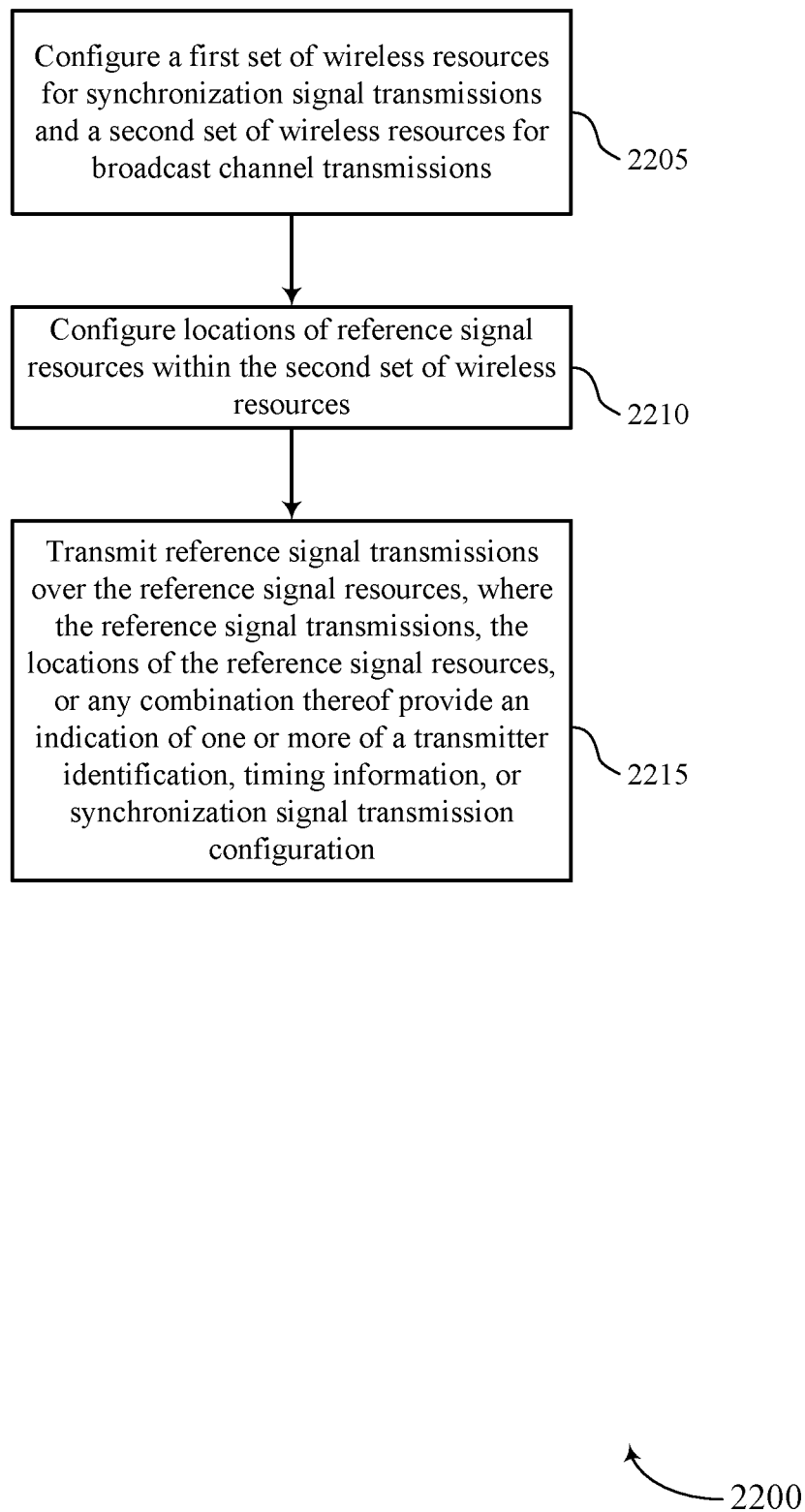

FIG. 22 shows a flowchart illustrating a method 2200 for reference signal schemes in wireless communications in accordance with aspects of the present disclosure. The operations of method 2200 may be implemented by a base station 105 or its components as described herein. For example, the operations of method 2200 may be performed by a base station synchronization signal block manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2205 the base station 105 may configure a first set of wireless resources for synchronization signal transmissions and a second set of wireless resources for broadcast channel transmissions. The operations of block 2205 may be performed according to the methods described herein. In certain examples, aspects of the operations of block 2205 may be performed by a resource identification manager as described with reference to FIGS. 13 through 16.

At block 2210 the base station 105 may configure locations of reference signal resources within the second set of wireless resources. The operations of block 2210 may be performed according to the methods described herein. In certain examples, aspects of the operations of block 2210 may be performed by a reference signal manager as described with reference to FIGS. 13 through 16.

At block 2215 the base station 105 may transmit reference signal transmissions over the reference signal resources, wherein the reference signal transmissions, the locations of the reference signal resources, or any combination thereof provide an indication of one or more of a transmitter identification, timing information, or synchronization signal transmission configuration. The operations of block 2215 may be performed according to the methods described herein. In certain examples, aspects of the operations of block 2215 may be performed by a reference signal manager as described with reference to FIGS. 13 through 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a first set of wireless resources for synchronization signal transmissions and a second set of wireless resources for broadcast channel transmissions, the first set of wireless resources comprising a first set of frequency resources that span a first bandwidth and the second set of wireless resources comprising a second set of frequency resources that span a second bandwidth that overlaps at least a portion of the first bandwidth, wherein the second set of wireless resources further comprises a first subset of time resources and a second subset of time resources;

identifying locations of reference signal resources within the second set of wireless resources based at least in part on one or more of a time resource location within the first subset of time resources, a time resource location within the second subset of time resources, or a frequency resource location within the second set of wireless resources relative to the first bandwidth, wherein the first subset of time resources and the second subset of time resources are associated with different reference signal waveforms; and receiving reference signal transmissions using the reference signal resources.

2. The method of claim 1, wherein the second bandwidth is larger than the first bandwidth.

3. The method of claim 1, wherein the identifying locations of the reference signal resources comprises:
identifying non-uniformly distributed reference signal resources across the second set of frequency resources.

4. The method of claim 3, wherein:
the second set of frequency resources comprise a first subset of frequency resources that are overlapping with the first bandwidth and a second subset of frequency resources that are non-overlapping with the first bandwidth; and
the second subset of frequency resources has a higher density of reference signal resources than the first subset of frequency resources.

5. The method of claim 4, wherein the first subset of frequency resources is devoid of reference signal resources.

6. The method of claim 1, wherein:
the reference signal resources are non-uniformly distributed across the first subset of time resources and the second subset of time resources.

7. The method of claim 1, wherein:
the reference signal resources within the first subset of time resources occupy different frequency resources than at least a portion of reference signal resources within the second subset of time resources.

8. The method of claim 1, wherein:
at least a portion of the reference signal resources within the first subset of time resources and the second subset of time resources occupy common frequency tones.

9. The method of claim 1, wherein the second set of wireless resources comprise physical broadcast channel (PBCH) resources and the first set of wireless resources comprise synchronization signal resources.

10. The method of claim 9, wherein:
the PBCH resources comprise a first symbol of time resources and a third symbol of time resources; and
the synchronization signal resources comprise a second symbol of time resources and a fourth symbol of time resources, the second symbol of time resources located between the first symbol of time resources and the third symbol of time resources, and the fourth symbol of time resources located after the second symbol of time resources.

11. The method of claim 10, wherein the second symbol of time resources is for transmission of a secondary synchronization signal and the fourth symbol of time resources is for transmission of a primary synchronization signal.

12. The method of claim 1, wherein the reference signal transmissions comprise demodulation reference signal (DMRS) transmissions.

13. The method of claim 1, wherein the locations of the reference signal resources are within the first subset of time resources and the second subset of time resources, and wherein the method further comprises:
determining a waveform of the reference signal transmissions based at least in part on the locations of the reference signal resources; and
performing a channel estimation based at least in part on the received reference signal transmissions and the determined waveform of the reference signal transmissions.

14. The method of claim 1, further comprising:
determining one or more of a transmitter identification, timing information, or synchronization signal transmission configuration based at least in part on the received reference signal transmissions.

15. A method for wireless communication, comprising:
configuring a first set of wireless resources for synchronization signal transmissions and a second set of wireless resources for broadcast channel transmissions, the first set of wireless resources comprising a first set of frequency resources that span a first bandwidth and the second set of wireless resources comprising a second set of frequency resources that span a second bandwidth that overlaps at least a portion of the first bandwidth, wherein the second set of wireless resources further comprises a first subset of time resources and a second subset of time resources;
configuring reference signal resources within the second set of wireless resources, locations of the reference signal resources based at least in part on one or more of a time resource location within the first subset of time resources, a time resource location within the second subset of time resources, or a frequency resource location within the second set of wireless resources relative to the first bandwidth, wherein the first subset of time resources and the second subset of time resources are associated with different reference signal waveforms; and
transmitting reference signal transmissions using the reference signal resources and synchronization signal transmissions using the first set of wireless resources.

16. The method of claim 15, wherein the second bandwidth is larger than the first bandwidth.

17. The method of claim 15, wherein the configuring locations of the reference signal resources comprises:
configuring non-uniformly distributed reference signal resources across the second set of frequency resources.

18. The method of claim 17, wherein:
the second set of frequency resources comprise a first subset of frequency resources that are overlapping with the first bandwidth and a second subset of frequency resources that are non-overlapping with the first bandwidth; and
the second subset of frequency resources has a higher density of reference signal resources than the first subset of frequency resources.

19. The method of claim 18, wherein the first subset of frequency resources is devoid of reference signal resources.

20. The method of claim 15, wherein:
the reference signal resources are non-uniformly distributed across the first subset of time resources and the second subset of time resources.

21. The method of claim 15, wherein:
the reference signal resources within the first subset of time resources occupy different frequency resources than at least a portion of reference signal resources within the second subset of time resources.

22. The method of claim 15, wherein:
at least a portion of the reference signal resources within the first subset of time resources and the second subset of time resources occupy common frequency tones.

23. The method of claim 15, wherein the second set of wireless resources comprise physical broadcast channel (PBCH) resources and the first set of wireless resources comprise synchronization signal resources.

24. The method of claim 23, wherein:
the PBCH resources comprise a first symbol of time resources and a third symbol of time resources; and
the synchronization signal resources comprise a second symbol of time resources and a fourth symbol of time resources, the second symbol of time resources located between the first symbol of time resources and the third symbol of time resources, and the fourth symbol of time resources located after the third symbol of time resources.

25. The method of claim 24, wherein the second symbol of time resources is for transmission of a secondary synchronization signal and the fourth symbol of time resources is for transmission of a primary synchronization signal.

26. The method of claim 15, wherein the reference signal transmissions comprise demodulation reference signal (DMRS) transmissions.

27. The method of claim 15, further comprising:
providing an indication of one or more of a transmitter identification, timing information, or synchronization signal transmission configuration based at least in part on the reference signal transmissions.

28. An apparatus for wireless communication, comprising:
a processor,
memory in electronic communication with the processor; and
instructions stored in the memory and executable by the processor to cause the apparatus to:
identify a first set of wireless resources for synchronization signal transmissions and a second set of wireless resources for broadcast channel transmissions, the first set of wireless resources comprising a first set of frequency resources that span a first bandwidth and the second set of wireless resources comprising a second set of frequency resources that span a second bandwidth that overlaps at least a portion of the first bandwidth, wherein the second set of wireless resources further comprises a first subset of time resources and a second subset of time resources;
identify locations of reference signal resources within the second set of wireless resources based at least in part on one or more of a time resource location within the first subset of time resources, a time resource location within the second subset of time resources, or a frequency resource location within the second set of wireless resources relative to the first bandwidth, wherein the first subset of time resources and the second subset of time resources have different reference signal waveforms; and
receive reference signal transmissions using the reference signal resources.

29. The apparatus of claim 28, wherein the second bandwidth is larger than the first bandwidth.

30. An apparatus for wireless communication, comprising:
a processor,
memory in electronic communication with the processor; and
instructions stored in the memory and executable by the processor to cause the apparatus to:
configure a first set of wireless resources for synchronization signal transmissions and a second set of wireless resources for broadcast channel transmissions, the first set of wireless resources comprising a first set of frequency resources that span a first bandwidth and the second set of wireless resources comprising a second set of frequency resources that span a second bandwidth that overlaps at least a portion of the first bandwidth, wherein the second set of wireless resources further comprises a first subset of time resources and a second subset of time resources;
configure reference signal resources within the second set of wireless resources, locations of the reference signal resources based at least in part on one or more of a time resource location within the first subset of time resources, a time resource location within the second subset of time resources, or a frequency resource location within the second set of wireless resources relative to the first bandwidth, wherein the first subset of time resources and the second subset of time resources have different reference signal waveforms; and
transmit reference signal transmissions using the reference signal resources and synchronization signal transmissions using the first set of wireless resources.

* * * * *